(12) United States Patent
Lim et al.

(10) Patent No.: US 12,068,986 B2
(45) Date of Patent: Aug. 20, 2024

(54) TECHNIQUE FOR TRANSMITTING AND RECEIVING FRAME IN WIRELESS COMMUNICATION SYSTEM

(71) Applicant: LG ELECTRONICS INC., Seoul (KR)

(72) Inventors: Dongguk Lim, Seoul (KR); Eunsung Park, Seoul (KR); Insun Jang, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 550 days.

(21) Appl. No.: 17/278,633

(22) PCT Filed: Oct. 1, 2019

(86) PCT No.: PCT/KR2019/012809
§ 371 (c)(1),
(2) Date: Mar. 22, 2021

(87) PCT Pub. No.: WO2020/071726
PCT Pub. Date: Apr. 9, 2020

(65) Prior Publication Data
US 2022/0045812 A1 Feb. 10, 2022

(30) Foreign Application Priority Data

Oct. 1, 2018 (KR) .................. 10-2018-0117210
Jan. 10, 2019 (KR) .................. 10-2019-0003507

(51) Int. Cl.
*H04L 5/00* (2006.01)
*H04L 27/26* (2006.01)
*H04W 84/12* (2009.01)

(52) U.S. Cl.
CPC ............ *H04L 5/0048* (2013.01); *H04L 5/001* (2013.01); *H04L 5/0098* (2013.01); *H04L 27/26* (2013.01); *H04W 84/12* (2013.01)

(58) Field of Classification Search
CPC ..... H04L 5/0048; H04L 5/001; H04L 5/0098; H04L 27/26; H04L 27/2603; H04L 27/2602; H04W 84/12
See application file for complete search history.

(56) References Cited

U.S. PATENT DOCUMENTS

| | | | |
|---|---|---|---|
| 11,057,888 B2* | 7/2021 | Kenney | H04W 84/18 |
| 2018/0183908 A1 | 6/2018 | Trainin et al. | |
| 2021/0014112 A1* | 1/2021 | Sadeghi | H04W 72/04 |

FOREIGN PATENT DOCUMENTS

| | | | | |
|---|---|---|---|---|
| CN | 110460415 A | * | 11/2019 | ........... H04L 5/0001 |
| KR | 20160073319 | | 6/2016 | |

(Continued)

OTHER PUBLICATIONS

CN-110460415 (English) (Year: 2019).*
PCT International Application No. PCT/KR2019/012809, International Search Report dated Jan. 3, 2020, 4 pages.

*Primary Examiner* — Jianye Wu
(74) *Attorney, Agent, or Firm* — LEE, HONG, DEGERMAN, KANG & WAIMEY

(57) ABSTRACT

An example according to the present specification relates to a method for transmitting an NGV PPDU. A transmission STA may generate an NGV PPDU, and may transmit the NGV PPDU. The NGV PPDU may include a plurality of fields. The NGV PPDU may be transmitted according to various bandwidths and frequency spacings. The NGV PPDU may be transmitted on the basis of a guard region having a first subcarrier index range, a direct current (DC) region having a second subcarrier index range, and a data and pilot area having a third subcarrier index range.

12 Claims, 43 Drawing Sheets

(56) References Cited

FOREIGN PATENT DOCUMENTS

| KR | 20160125417 | 10/2016 |
|----|-------------|---------|
| KR | 20170126448 | 11/2017 |
| KR | 20180091032 | 8/2018  |

* cited by examiner

TECHNIQUE FOR TRANSMITTING AND RECEIVING FRAME IN WIRELESS COMMUNICATION SYSTEM

CROSS-REFERENCE TO RELATED APPLICATIONS

This application is the National Stage filing under 35 U.S.C. 371 of International Application No. PCT/KR2019/012809, filed on Oct. 1, 2019, which claims the benefit of earlier filing date and right of priority to KR Application Nos. 10-2018-0117210, filed on Oct. 1, 2018 and 10-2019-0003507, filed on Jan. 10, 2019, the contents of which are all incorporated by reference herein in their entireties.

BACKGROUND OF THE DISCLOSURE

Field of the Disclosure

This specification relates to a method for transmitting and receiving a frame in various wireless communication systems including a wireless LAN system.

Related Art

Wireless network technologies may include various types of wireless local area networks (WLAN). WLAN may be used for interconnecting neighboring devices by adopting networking protocols that are extensively used. The various technical features that are described in this specification may be applied to a random communication standard, such as Wi-Fi, or more generally, any one of the IEEE 802.11 wireless protocol group.

In the wireless local area network (WLAN), the method for transmitting and receiving frames has been enhanced through various methods. For example, as one of the various methods, the related art standard proposed a tone plan for transmitting frames. Herein, a tone plan may be configured based on bandwidths and sub-carrier spacing.

This specification proposes technical features that are capable of enhancing the related art WLAN or that may be applicable to new communication standards. For example, a new communication standard may be an Extreme High Throughput (EHT) standard, which is currently being discussed. The EHT standard may use increased bandwidths, enhanced PHY protocol data unit (PPDU) structures, enhanced sequences, Hybrid Automatic Repeat request (HARQ) schemes, and so on, which are newly proposed.

SUMMARY OF THE DISCLOSURE

Technical Objects

A Next Generation Vehicular (or Next Generation Vehicular network or Next-Generation V2X) (NGV) system may be proposed in order to enhance 2x throughput and to support high speed in contrast with a system of the 802.11p standard, which is used for VEHICLE-TO-EVERYTHING (V2X) at a 5.9 GHz band. Therefore, in the NGV system, a method for transmitting a signal by using an Orthogonal Frequency Division Multiplexing (OFDM) numerology that is different from the conventional 802.11p standard may be required.

More specifically, a wide bandwidth (20 MHz) transmission other than the conventional 10 MHz transmission is proposed in the NGV system in order to enhance 2x throughput. Therefore, when 10 MHz and 20 MHz bandwidths are used in the NGV system for enhanced performance, a new OFDM tone configuration method for transmitting and/or receiving frames may be required.

Technical Solutions

An example of this specification relates to a method and/or device for receiving signals in a Wireless Local Area Network (WLAN) system.

A transmitting STA according to an example of this specification may generate a Next Generation Vehicular network (NGV) Physical Protocol Data Unit (PPDU) including a legacy control field, an NGV control field, and an NGV data field.

A transmitting STA according to an example of this specification may transmit the NGV PPDU. A bandwidth of the NGV PPDU may be 20 MHz. The NGV PPDU may be transmitted based on frequency spacing of 156.25 kHz.

According to an example of this specification, the NGV PPDU may be transmitted based on a guard region having a first sub-carrier index range, a Direct Current (DC) region having a second sub-carrier index range, and a data and pilot region having a third sub-carrier index range.

Effects of the Disclosure

This specification proposes technical features supporting situations where a 5.9 GHz band is being used in various types of wireless LAN systems (e.g., IEEE 802.11bd system). Based on various examples of this specification, throughput enhancement and high speed of Dedicated Short Range Communication (DSRC) (802.11p) may be supported in order to facilitate V2X support at the 5.9 GHz band.

Additionally, according to the various examples of this specification, an NGV OFDM tone configuration method for performing wide bandwidth transmission of NGV and for reducing Doppler effect may be proposed. And, according to the various examples of this specification, the throughput may be enhanced and the Doppler effect may be reduced.

DESCRIPTION OF EXEMPLARY EMBODIMENTS

The following examples of this specification may be applied to various wireless communication systems. For example, the following examples of this specification may be applied to a wireless local area network (WLAN) system. For example, this specification may be applied to the IEEE 802.11p standard, the IEEE 802.11a/g/n/ac standards, or the IEEE 802.11ax standard. For example, this specification may also be applied to a newly proposed NGV standard or IEEE 802.11bd standard. Additionally, this specification may also be applied to a newly proposed EHT standard or IEEE 802.11be standard. Furthermore, examples of this specification may also be applied to other new WLAN standards, which are enhanced versions of the above-mentioned various wireless LAN standards.

In the present specification, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

In the present specification, parentheses may indicate "for example". Specifically, "control information (Signal)" may mean that "Signal" is proposed as an example of "control information". Further, "control information (i.e., signal)" may also mean that "signal" is proposed as an example of "control information".

Hereinafter, technical features of the WLAN system to which the present disclosure may be applied will be described to describe the technical features of the present disclosure.

A wireless LAN system may perform communication through at least one channel included in various bands (e.g., 20/40/80/160/320 MHz channels).

Figure 1:
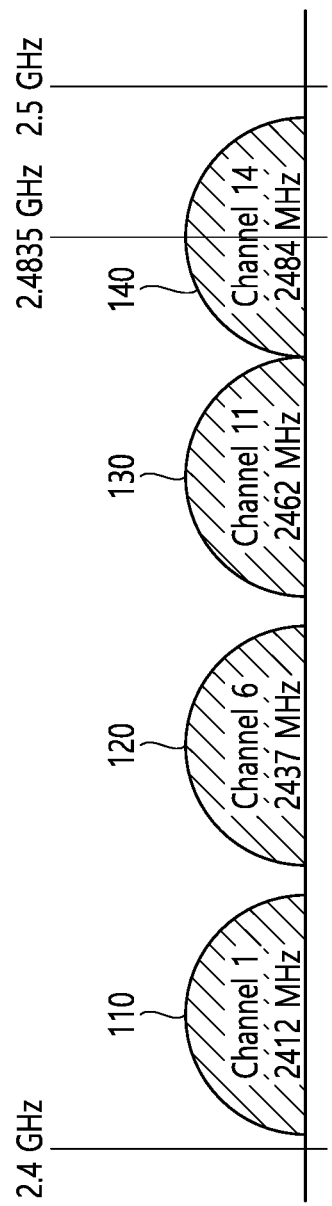
FIG. 1 illustrates an example of channels used/supported/defined in a 2.4 GHz band.

FIG. 1 illustrates an example of channels used/supported/defined in a 2.4 GHz band.

The 2.4 GHz band may be referred to by other names such as a first band or the like. In addition, the 2.4 GHz band may refer to a frequency region in which channels with a center frequency adjacent to 2.4 GHz (e.g., channels with a center frequency located in 2.4 to 2.5 GHz) are used/supported/defined.

The 2.4 GHz band may include multiple 20 MHz channels. 20 MHz in the 2.4 GHz band may have multiple channel indexes (e.g., index 1 to index 14). For example, a center frequency of a 20 MHz channel to which channel index 1 is assigned may be 2.412 GHz, a center frequency of the 20 MHz channel to which channel index 2 is assigned may be 2.417 GHz, and a center frequency of the 20 MHz channel to which channel index N is assigned may be (2.407+0.005*N) GHz. The channel index may be referred to by various names such as channel number or the like. Specific values of the channel index and the center frequency may be changed.

FIG. 1 exemplarily illustrates four channels in a 2.4 GHz band. The illustrated first to fourth frequency regions 110 to 140 may each include one channel. For example, a first frequency region 110 may include channel #1 (a 20 MHz channel having index 1). Here, a center frequency of channel #1 may be set to 2412 MHz. A second frequency region 120 may include channel #6. Here, a center frequency of channel #6 may be set to 2437 MHz. A third frequency region 130 may include channel #11. Here, a center frequency of channel #11 may be set to 2462 MHz. A fourth frequency region 140 may include channel #14. Here, a center frequency of channel #14 may be set to 2484 MHz.

Figure 2:
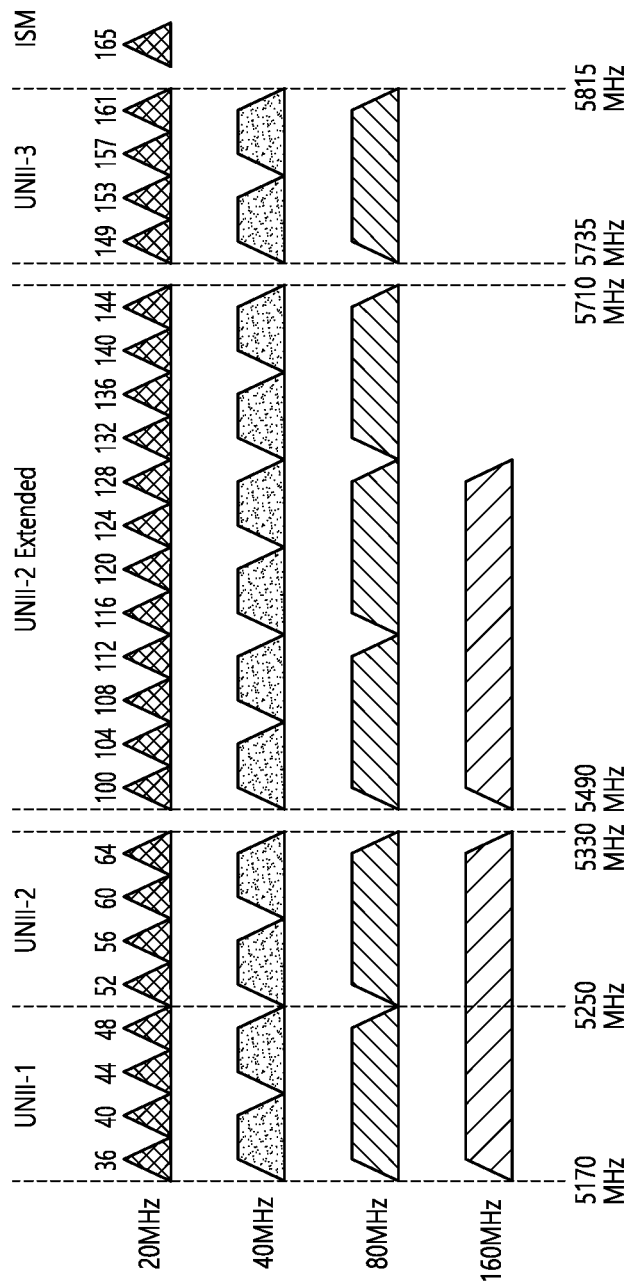
FIG. 2 illustrates an example of a channel used/supported/defined in a 5 GHz band.

FIG. 2 illustrates an example of a channel used/supported/defined in a 5 GHz band.

The 5 GHz band may be referred to by other names such as a second band. The 5 GHz band may refer to a frequency region (or frequency range) in which channels having a center frequency of 5 GHz or higher and less than 6 GHz (or less than 5.9 GHz) are used/supported/defined. Alternatively, the 5 GHz band may include a plurality of channels between 4.5 GHz and 5.5 GHz. The specific values illustrated in FIG. 2 may be changed.

A plurality of channels in the 5 GHz band include unlicensed national information infrastructure (UNII)-1, UNII-2, UNII-3, and ISM. UNII-1 may be called UNII Low. UNII-2 may include a frequency region called UNII Mid and UNII-2 Extended. UNII-3 may be called UNII-Upper.

A plurality of channels may be set in the 5 GHz band, and a bandwidth of each channel may be variously set to 20 MHz, 40 MHz, 80 MHz, or 160 MHz. For example, the 5170 MHz to 5330 MHz frequency region/range in UNII-1 and UNII-2 may be divided into eight 20 MHz channels. The 5170 MHz to 5330 MHz frequency region/range may be divided into four channels through the 40 MHz frequency region. The 5170 MHz to 5330 MHz frequency region/range may be divided into two channels through the 80 MHz frequency region. Alternatively, the 5170 MHz to 5330 MHz frequency region/range may be divided into one channel through the 160 MHz frequency region.

Figure 3:
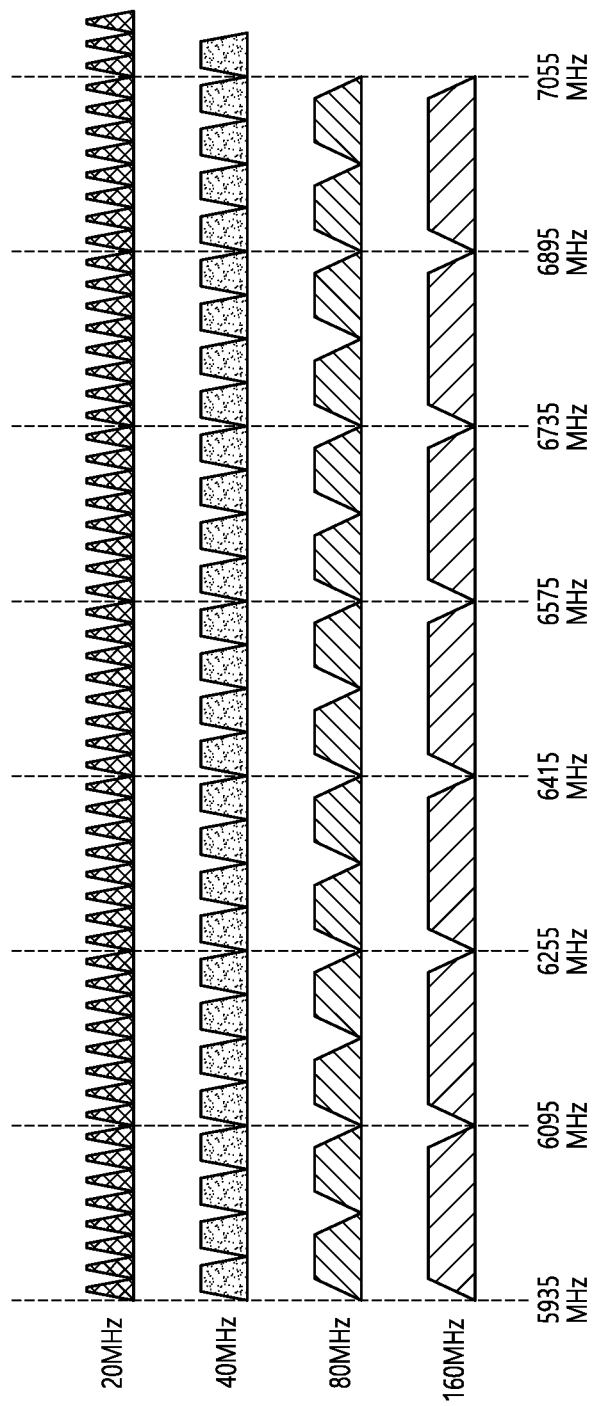
FIG. 3 illustrates an example of channels used/supported/defined in a 6 GHz band.

FIG. 3 illustrates an example of channels used/supported/defined in a 6 GHz band.

The 6 GHz band may be referred to by other names such as a third band. The 6 GHz band may refer to a frequency range in which channels having a center frequency of 5.9 GHz or higher are used/supported/defined. Specific numerical values illustrated in FIG. 3 may be changed.

For example, the 20 MHz channel of FIG. 3 may be defined from 5.940 GHz. Specifically, the leftmost channel among the 20 MHz channels of FIG. 3 may have an index number #1 (or a channel index, a channel number, etc.) and a center frequency of 5.945 GHz may be allocated. That is, the center frequency of channel having the index #N may be determined as (5.940+0.005*N) GHz.

Accordingly, indexes (or channel numbers) of the 20 MHz channel of FIG. 3 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, and 233. In addition, according to the aforementioned (5.940+0.005*N) GHz rule, indexes of the 40 MHz channel of FIG. 20 may be 3, 11, 19, 27, 35, 43, 51, 59, 67, 75, 83, 91, 99, 107, 115, 123, 131, 139, 147, 155, 163, 171, 179, 187, 195, 203, 211, 219, and 227.

In the example of FIG. 3, 20, 40, 80, and 160 MHz channels are shown, but additionally, a 240 MHz channel or a 320 MHz channel may be added.

Figure 4:
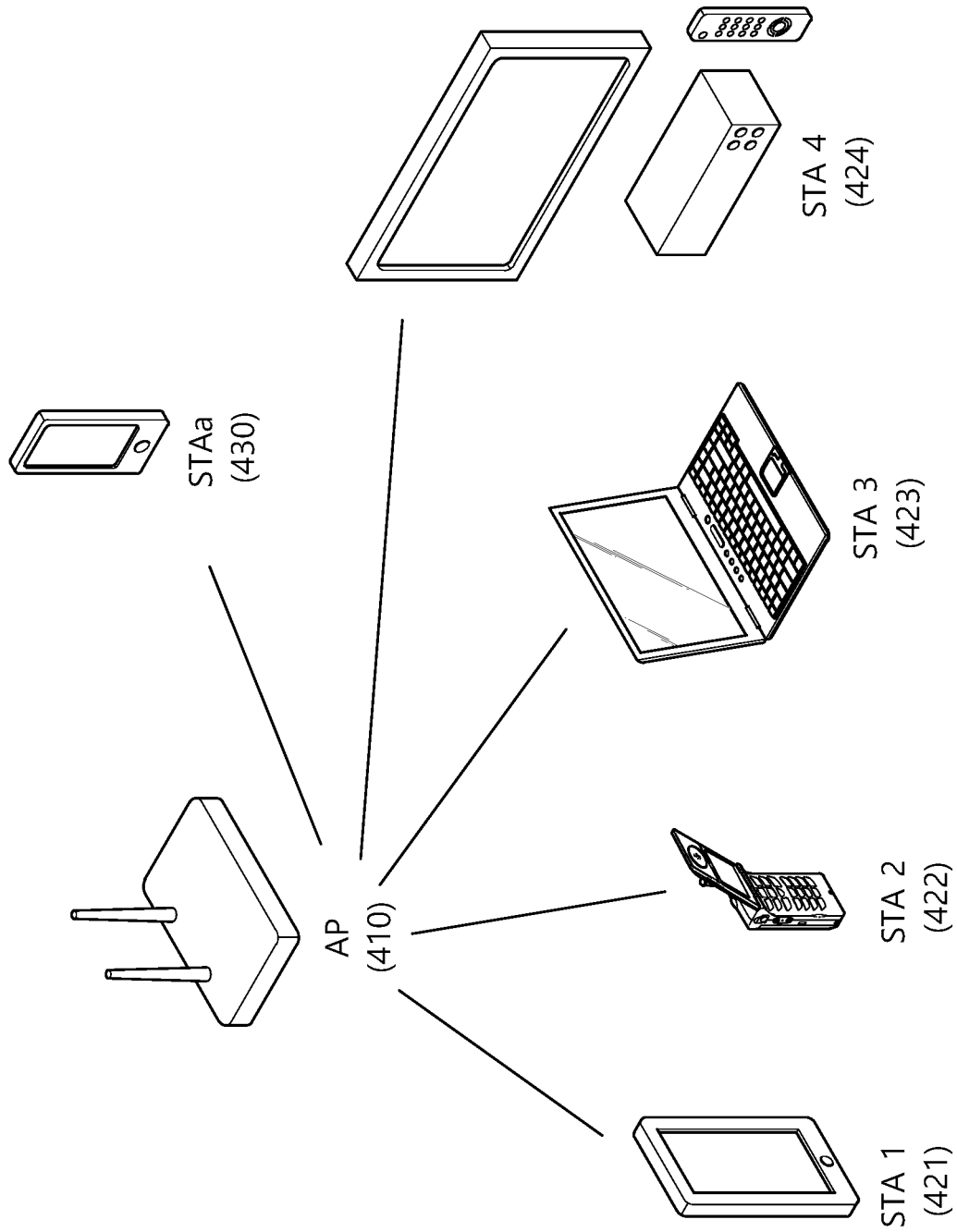
FIG. 4 shows an example of a WLAN system to which the example of the present disclosure may be applied.

FIG. 4 shows an example of a WLAN system to which the example of the present disclosure may be applied.

Referring to FIG. 4, a WLAN system includes one or more basic service sets (BSS). The BSS is a set of stations (STAs) that may be successfully synchronized to communicate with each other.

An infrastructure BSS may include one or more non-AP stations 421, 422, 423, 424, and 430, an access point (AP) 410 providing a distributed service, and a distribution system (DS) connecting a plurality of APs. In the infrastructure BSS, the AP may manage the non-AP STAs in the BSS.

The distribution system may form an extended service set (ESS), which is an extended service set by connecting several BSSs. The ESS may be used as a term indicating one network formed by connecting one or several APs through a distribution system. APs included in one ESS may have the same service set identification (SSID).

A portal may serve as a bridge for connecting a wireless LAN network (IEEE 802.11) and another network (e.g., 802.X).

The STAs may establish a network to perform communication, without the AP. Such a network may be referred to as an ad-hoc network or an independent basic service set (IBSS).

Figure 5:
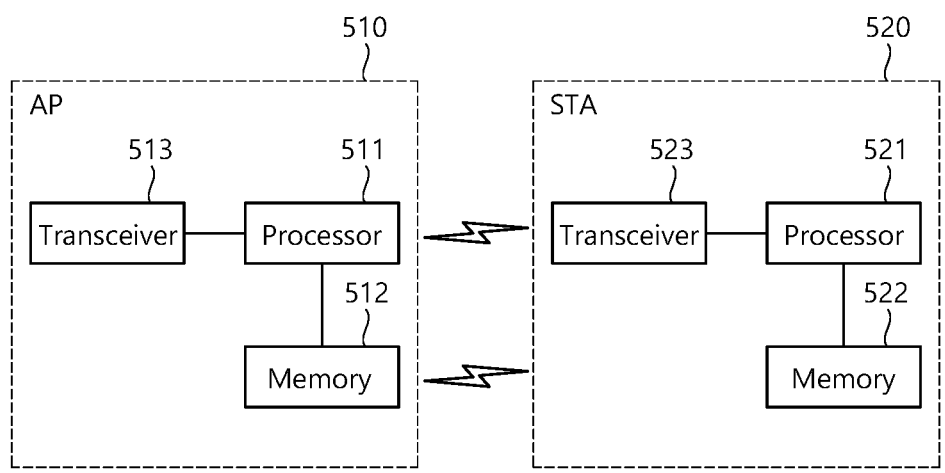
FIG. 5 shows an example of a station included in a WLAN system.

FIG. 5 shows an example of a station included in a WLAN system.

An example of the present disclosure may be performed by the device of FIG. 5.

In an example of the present disclosure, an STA may refer to an AP STA 510 and/or a non-AP STA 520. That is, the STAs 510 and 520 may be used as having a meaning including both an AP and a non-AP STA and, in a broad sense, as a certain function al medium including a medium access control (MAC) according to the regulations of the IEEE 802.11 standard and a physical layer interface for a wireless medium.

The non-AP STA 520 may be referred to by various names such as a mobile terminal, a wireless device, a wireless transmit/receive unit (WTRU), a user equipment (UE), a mobile station (MS), a mobile subscriber unit, or simply, a user.

Referring to FIG. 5, the AP STA 510 may include a processor 511, a memory 512, and a transceiver 513. The illustrated processor, memory, and transceiver may each be implemented as separate chips or at least two or more blocks/functions may be implemented through a single chip.

The transceiver 513 of the AP performs a signal transmission/reception operation. Specifically, IEEE 802.11 packets (e.g., IEEE 802.11a/b/g/n/ac/ax/be, etc.) may be transmitted and received.

The processor 511 of the AP may perform an intended operation of the AP. For example, the processor 511 of the AP may receive a signal through the transceiver 513, process the received signal, generate a transmission signal, and perform control for signal transmission. The memory 512 of the AP may store a signal (i.e., a received signal) received through the transceiver 513 and store a signal (i.e., a transmission signal) to be transmitted through the transceiver.

A transceiver 523 of the non-AP STA performs a signal transmission/reception operation. Specifically, the non-AP STA may transmit and receive IEEE 802.11 packets (e.g., IEEE 802.11a/b/g/n/ac/ax/be, etc.).

A processor 521 of the non-AP STA may perform an intended operation of the AP. For example, the processor 521 of the non-AP STA may receive a signal through the transceiver 523, process the received signal, generate a transmission signal, and perform control for signal transmission. A memory 522 of the non-AP STA may store a signal (i.e., a received signal) received through the transceiver 523 and store a signal (i.e., a transmission signal) to be transmitted through the transceiver.

Figure 6:
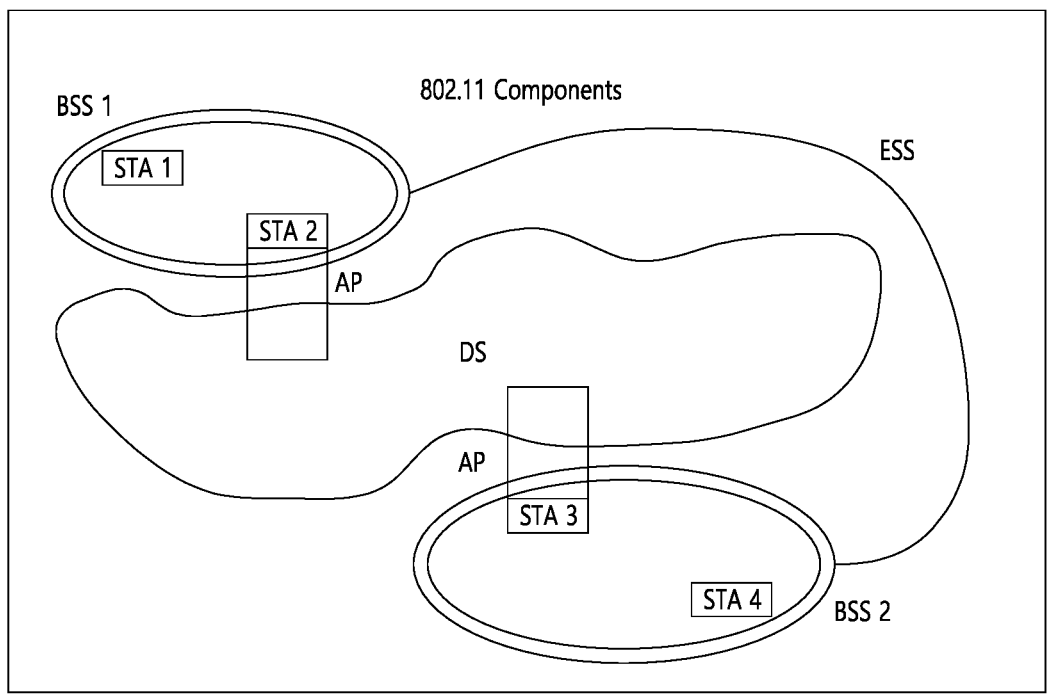
FIG. 6 shows an example of a WLAN system.

FIG. 6 shows an example of a WLAN system.

As shown, the WLAN system includes at least one access point (AP) and a plurality of STAs associated with the AP.

A plurality of STAs shown in FIG. 6 may configure a basic service set (BSS).

The BSS may refer to a set of APs and STAs, such as APs and STAs that may be successfully synchronized to communicate with each other. The BSS may include one or more STAs that may be combined with an AP.

The BSS may include at least one STA, APs providing a distribution service, and a distribution system (DS) 110 connecting multiple APs.

The distribution system may implement an extended service set (ESS) extended by connecting the multiple BSSs. The ESS may be used as a term indicating one network configured by connecting one or more APs through the distribution system.

A portal may serve as a bridge which connects the wireless LAN network (IEEE 802.11) and another network (e.g., 802.X).

Figure 7:
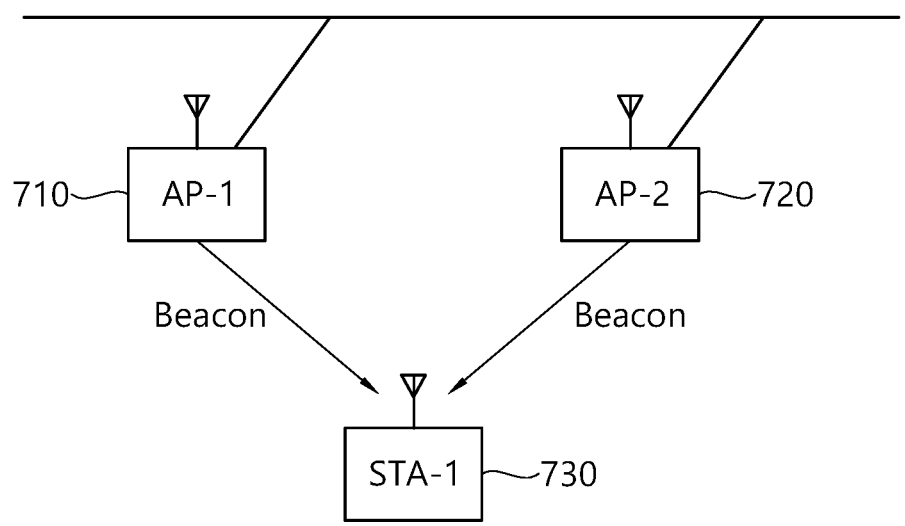
FIG. 7 illustrates an example of network discovery.

FIG. 7 illustrates an example of network discovery.

In order to access the WLAN network, the STA should perform network discovery. Such discovery may be performed through a scanning process for a network. The scanning method may be divided into active scanning and passive scanning.

The example of FIG. 7 may be related to passive scanning.

Specifically, AP-1 710 and AP-2 720 may transmit a beacon frame during a preset time period. An STA 730 may receive information related to an AP and/or a WLAN system through the received beacon frame.

The beacon frame is an example of a management frame in IEEE 802.11. The beacon frame may be transmitted periodically. An STA performing scanning based on passive scanning may receive a beacon frame, while shifting channels. Upon receiving the beacon frame, the STA 730 may store BSS-related information included in the received beacon frame, shift to a next channel, and perform passive scanning in the next channel.

Figure 8:
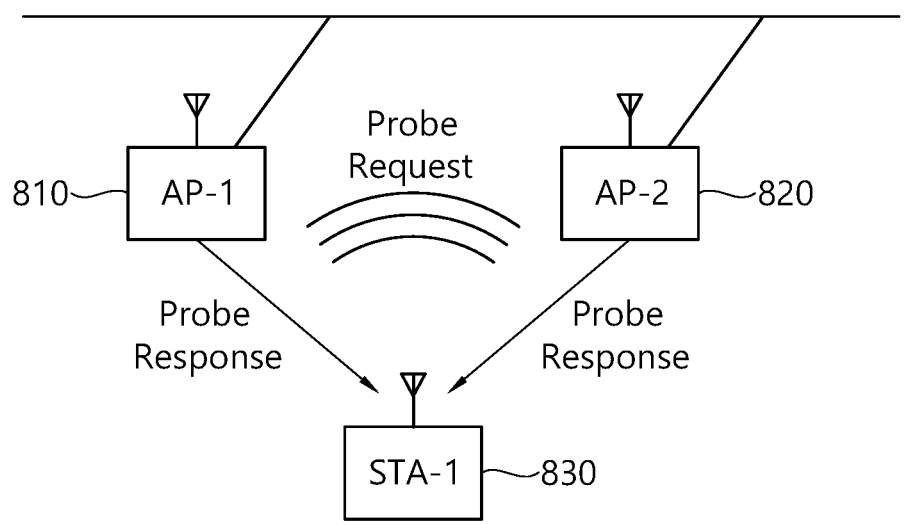
FIG. 8 shows another example of network discovery.

FIG. 8 shows another example of network discovery.

The example of FIG. 8 may be related to active scanning.

As illustrated in FIG. 8, the STA 830 that performs active scanning may transmit a probe request frame to search for an AP 810, 820 present in the vicinity, while moving channels, and wait for a response thereto. A responder may transmit a probe response frame to the STA that has transmitted the probe request frame in response to the probe request frame. The responder may be an STA that last transmitted a beacon frame in a BSS of the channel being scanned. In the BSS, since an AP transmits a beacon frame, the AP becomes a responder, and in an IBSS, since STAs in the IBSS transmit beacon frames by taking turns, the responder may be changed.

When the STA transmits the probe request frame through channel #1 and receives the probe response frame through channel #1, the STA may store BSS-related information included in the received probe response frame, move to a next channel (e.g., channel #2), and repeat scanning in the same manner.

Figure 9:
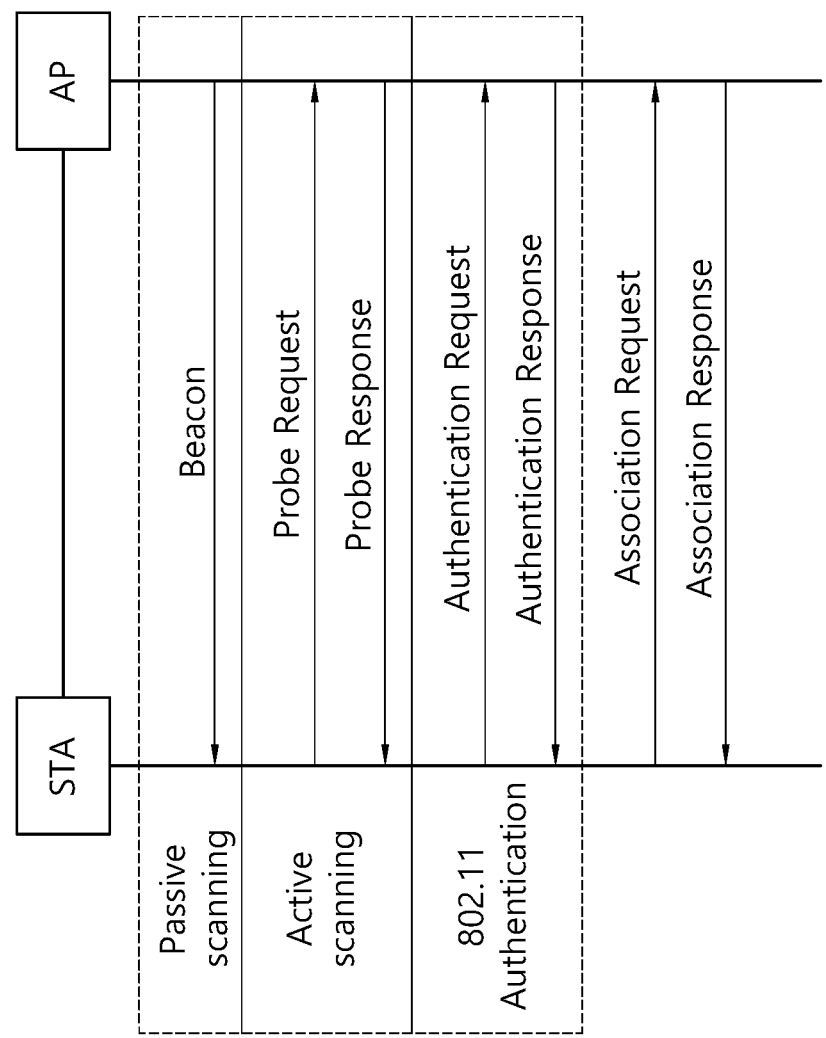
FIG. 9 shows an example of scanning and subsequent operations.

FIG. 9 shows an example of scanning and subsequent operations.

The example of FIG. 9 may be performed based on FIGS. 7 and 8. That is, the user STA may receive the beacon frame of FIG. 7. Alternatively, the user STA may transmit a probe request frame and receive a probe response frame as shown in FIG. 8.

Thereafter, an authentication process as shown in FIG. 9 may be performed. For example, the STA may transmit an authentication request frame to the AP, and in response thereto, the AP may transmit an authentication response frame to the STA. An authentication frame used for authentication request/response corresponds to a management frame.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform the association process. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

Figure 10:
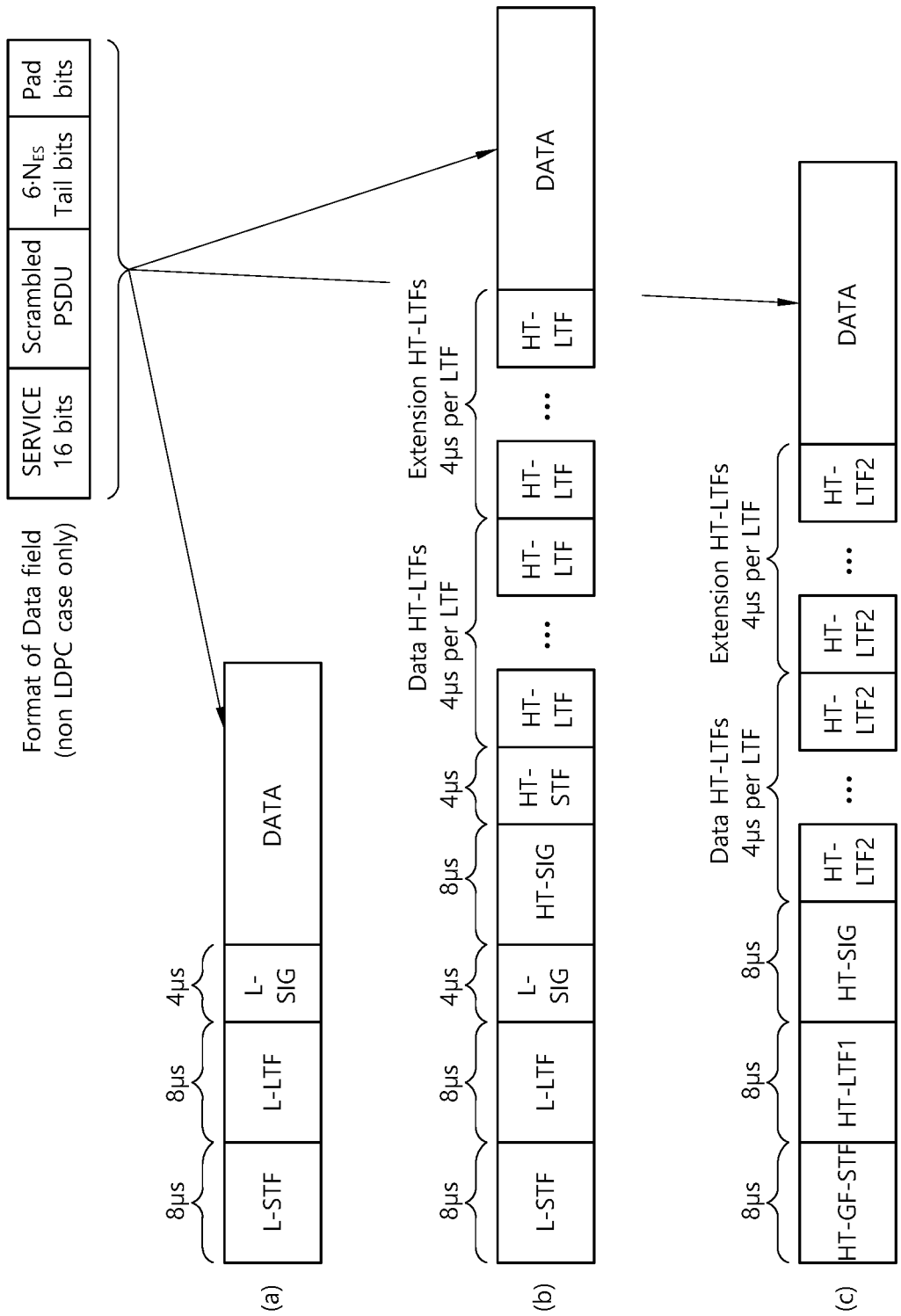
FIG. 10 shows an example of a PPDU used in a legacy WLAN system.

FIG. 10 shows an example of a PPDU used in a legacy WLAN system.

Sub-figure (a) of FIG. 10 shows an example of a PPDU used in the IEEE 802.11a/g standard.

Sub-figure (b) of FIG. 10 shows an example of a PPDU used in the IEEE 802.11n standard.

Sub-figure (c) of FIG. 10 shows another example of a PPDU used in the IEEE 802.11n standard.

In general, the PPDU may include a short training field (STF). STF may be embodied as L L-STF, HT-STF, VHT-STF, HE-STF, EHT-STF, etc. used in the example of FIG. 10 or an additional example. STF may be used for frame detection, automatic gain control (AGC), diversity detection, coarse frequency/time synchronization, and the like.

A typical PPDU may include a long training field (LTF) 520. The LTF may be embodied as L-LTF, HT-LTF, VHT-LTF, HE-LTF, EHT-LTF, etc. used in the example of FIG. 10 or an additional example. LTF may be used for frequency/time synchronization and channel prediction.

A typical PPDU may include an SIG. The SIG may be embodied as L-SIG, HT-SIG, VHT-SIG, HE-SIG, EHT-SI, etc. used in the example of FIG. 10 or an additional example. The SIG may include control information for decoding the PPDU.

A typical PPDU may include a data field. The data field may be included in the example of FIG. 10 or an additional example. As illustrated in FIG. 10, the data field may include a SERVICE field, a physical layer service data unit (PSDU), a PPDU TAIL bit, and a padding bit. Some bits of the SERVICE field may be used for synchronization of a descrambler at a receiving end. The PSDU corresponds to a MAC protocol data init (MPDU) defined in a MAC layer and may include data generated/used in a higher layer. The PPDU TAIL bit may be used to return an encoder to a zero (0) state. The padding bit may be used to adjust a length of the data field in a predetermined unit.

Figure 11:
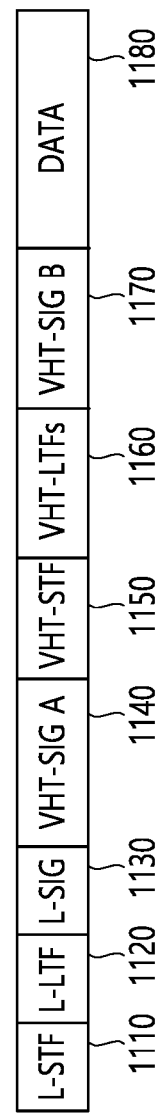
FIG. 11 shows another example of a PPDU according to a legacy WLAN standard.

FIG. 11 shows another example of a PPDU according to a legacy WLAN standard.

FIG. 11 shows an example of a PPDU according to the IEEE 802.11ac standard (i.e., VHT standard). The illustrated common fields include the legacy L-STF 1110, L-LTF 1120, and L-SIG 1130, and also include a VHT-SIG-A field 1140 newly proposed in the IEEE 802.11ac standard. The PPDU of FIG. 11 may be used in both single user (SU) communication in which a signal is transmitted from an AP to one user STA and multi-user (MU) communication in which a signal is transmitted from an AP to a plurality of user STAs. When MU communication is performed, the VHT-SIG-A field 1140 includes common control information commonly applied to all receiving STAs.

When the PPDU of FIG. 11 is used for MU communication, VHT-STF 1150, VHT-LTF 1160, VHT-SIG-B 1170, and data fields 1180 are configured as per-user fields.

The VHT-STF 1150 is an STF field newly proposed in the VHT standard (i.e., IEEE 802.11ac), and the VHT-LTF 1160 is an LTF field newly proposed in the VHT standard. The VHT-SIG-B 1170 includes information for decoding the data field 1180 and may be individually configured for each receiving STA.

The PPDU of FIG. 11 may be transmitted to a plurality of STAs based on a multi-user multiple input, multiple output (MU-MIMO) technique. In addition, it may be transmitted to one STA based on the SU-MIMO technique.

Figure 12:
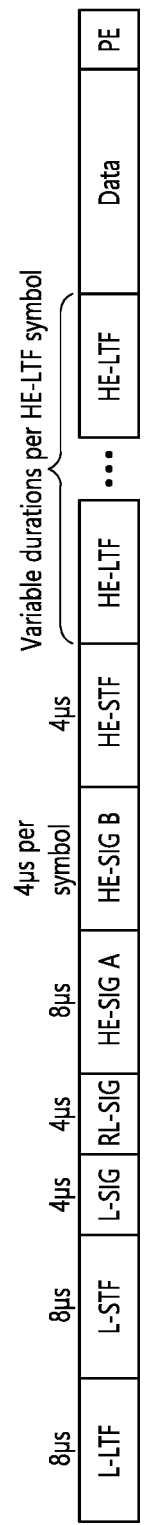
FIG. 12 is a diagram showing another example of an HE-PPDU.

FIG. 12 is a diagram showing another example of an HE-PPDU.

The example of FIG. 12 may be applied to an IEEE 802.11ax or high efficiency (HE) WLAN system. Four PPDU formats according to IEEE 802.11ax, are defined and an example of FIG. 12 is an example of MU-PPDU used for MU communication. However, some of the technical features applied to the field shown in FIG. 12 may be used as it is for SU communication or UL-MU communication.

The technical features of the HE-PPDU shown in FIG. 12 may be applied to a newly proposed EHT-PPDU. For example, technical features applied to HE-SIG may also be applied to EHT-SIG, and technical features applied to HE-STF/LTF may also be applied to EHT-SFT/LTF.

The L-STF of FIG. 12 may include a short training orthogonal frequency division multiplexing symbol (OFDM symbol). The L-STF may be used for frame detection, automatic gain control (AGC), diversity detection, and coarse frequency/time synchronization.

The L-LTF of FIG. 12 may include a long training orthogonal frequency division multiplexing symbol (OFDM). L-LTF may be used for fine frequency/time synchronization and channel prediction.

The L-SIG of FIG. 12 may be used to transmit control information. The L-SIG may include information related to a data rate and data length. In addition, the L-SIG may be repeatedly transmitted. That is, it may be configured in a format in which L-SIG is repeated (e.g., it may be referred to as R-LSIG).

HE-SIG-A of FIG. 12 may include control information common to a receiving station.

Specifically, the HE-SIG A may include 1) a DL/UL indicator, 2) a BSS color field which is an identifier of a BSS, 3) a field indicating a remaining time of a current TXOP section, 4) a bandwidth field indicating 20, 40, 80, 160, 80+80 MHz, 5) a field indicating an MCS scheme applied to an HE-SIG B, 6) a field indicating whether the HE-SIG B is modulated according to a dual subcarrier modulation technique for MCS, 7) a field indicating the number of symbols used for the HE-SIG B, 8) a field indicating whether the HE-SIG B is generated over the entire band, 9) a field indicating the number of symbols of the HE-LTF, 10) a field indicating a length of the HE-LTF and a CP length, 11) a field indicating whether there is an additional OFDM symbol for LDPC coding, 12) a field indicating control information related to packet extension (PE), and 13) a field indicating information related to a CRC field of the HE-SIG A. These specific fields of the HE-SIG A may be added or some of them may be omitted. In addition, in environments other than a multi-user (MU) environments, some fields in the HE-SIG-A may be added or omitted.

As described above, the HE-SIG B of FIG. 12 may be included only in the case of a PPDU for multiple users (MU). Basically, the HE-SIG A or the HE-SIG B may include resource allocation information (or virtual resource allocation information) for at least one receiving STA.

An HE-STF of FIG. 12 may be used to improve automatic gain control estimation in a multiple input multiple output (MIMO) environment or an OFDMA environment.

An HE-LTF of FIG. 12 may be used to estimate a channel in the MIMO environment or the OFDMA environment.

A size of fast Fourier transform (FFT)/inverse fast Fourier transform (IFFT) applied to the HE-STF and a field after the HE-STF of FIG. 12 may be different from a size of the FFT/IFFT applied to the field before the HE-STF. For example, the size of the FFT/IFFT applied to the HE-STF and the field after the HE-STF may be 4 times larger than the size of the FFT/IFFT applied to the field before the HE-STF.

For example, when at least one field among L-STF, L-LTF, L-SIG, HE-SIG A, and HE-SIG B on the PPDU of FIG. 12 is referred to as a first field/part, at least one of a data field, HE-STF, and HE-LTF may be referred to as a second field/part. The first field may include a field related to the legacy system, and the second field may include a field related to an HE system. In this case, the size of FFT/IFFT may be defined as N times the size of FFT/IFFT used in the legacy WLAN system (N is a natural number, e.g., N=1, 2, and 4). That is, FFT/IFFT having a size of N (=4) times may be applied to the second field of the HE PPDU, compared to the first field of the HE PPDU. For example, 256 FFT/IFFT may be applied for a bandwidth of 20 MHz, 512 FFT/IFFT may be applied for a bandwidth of 40 MHz, 1024 FFT/IFFT is applied for a bandwidth of 80 MHz, and 2048 FFT/IFFT may be applied for a continuous or discontinuous bandwidth of 160 MHz.

In other words, subcarrier spacing may have a size of 1/N times subcarrier spacing used in the legacy WLAN system (N is a natural number, for example, when N=4, 78.125 kHz). That is, subcarrier spacing having a size of 312.5 kHz which is legacy subcarrier spacing may be applied to the first field/part of the HE PPDU, and subcarrier spacing having a size of 78.125 kHz may be applied to the second field/part of the HE PPDU.

Alternatively, an IDFT/DFT period applied to each symbol of the first field may be expressed to be N (=4) times shorter than the IDFT/DFT period applied to each data symbol of the second field. That is, a length of IDFT/DFT applied to each symbol of the first field of the HE PPDU may be expressed as 3.2 μs, and a length of IDFT/DFT applied to each symbol of the second field of the HE PPDU may be expressed as 3.2 μs*4 (=12.8 μs). A length of an OFDM symbol may be a value obtained by adding a length of a guard interval (GI) to the length of the IDFT/DFT. The length of the GI may be various values such as 0.4 μs, 0.8 μs, 1.6 μs, 2.4 μs, and 3.2 μs.

As described above, the technical features in which subcarrier spacing of different sizes is applied to one PPDU may also be applied to the EHT-PPDU as it is. That is, subcarrier spacing having a size of 312.5 kHz may be applied to the first field/part of the EHT-PPDU, and subcarrier spacing having a size of 78.125 kHz may be applied to the second field/part of the EHT PPDU. The first field/part of the EHT-PPDU may include L-LTF, L-STF, L-SIG, EHT-SIG-A, and/or EHT-SIG-B. In addition, the second field/part of the EHT-PPDU may include EHT-STF, EHT-LTF, and/or a data field. The classification of the first part/second part of the EHT-PPDU may be changed.

Figure 13:
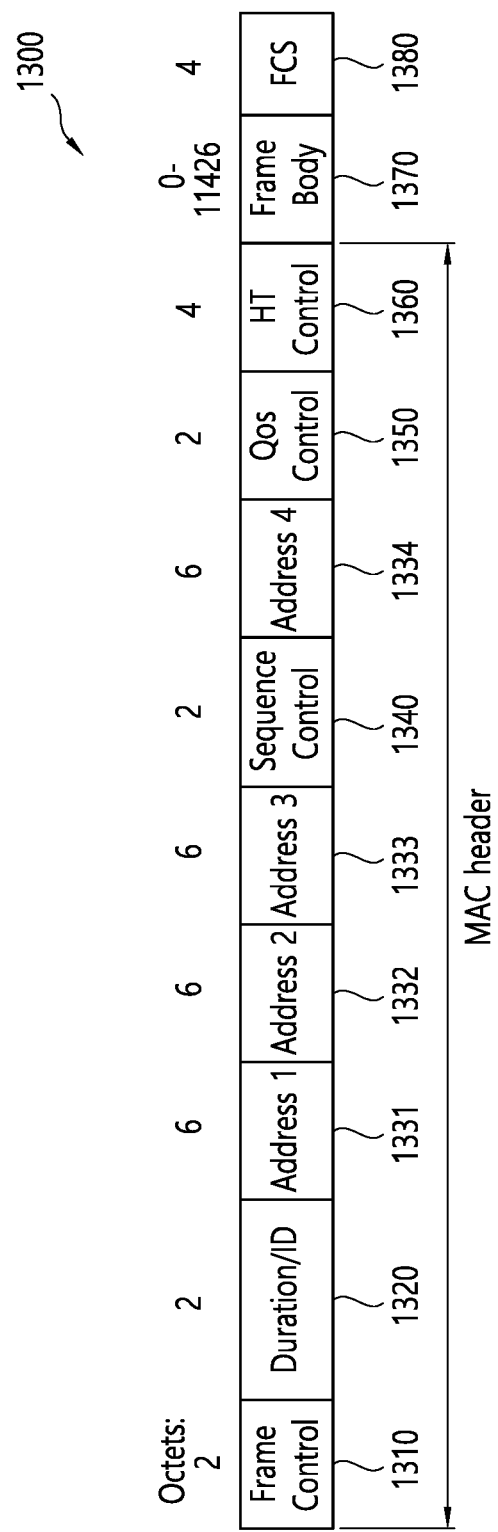
FIG. 13 shows an example of a MAC frame.

FIG. 13 shows an example of a MAC frame.

The MAC frame of FIG. 13 may be included in a data field (i.e., MPDU) of a PPDU presented herein.

Referring to FIG. 13, a MAC frame 1300 includes a frame control field 1310, a duration/ID (duration/ID) field 1320, an address 1 field 1331, an address 2 field 1332, an address 3 field 1333, a sequence control field 1340, an address 4 field 1334, a QoS control field 1350, an HT control field 1360, a frame body 1370, and a frame check sequence (FCS) field 1380.

Figure 14:
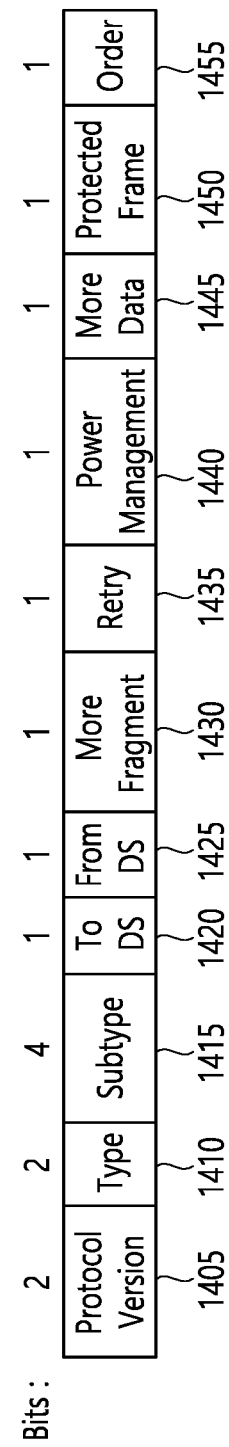
FIG. 14 is a block diagram showing an example of a frame control field format of a MAC frame.

The frame control field 1310 includes information related to frame characteristics. A specific structure of the frame control field 1310 is shown in FIG. 14.

The duration/ID field 1320 may be implemented to have different values according to a type and a subtype of the frame 1300. When the type and subtype of the frame 1300 are a PS-poll frame for power save operation, the duration/ID field 1320 may be set to include an AID of an STA that transmitted the frame 1300. In other cases, the duration/ID field 1320 may be set to have a specific duration value according to the frame 1300 type and subfield. When the frame 1300 is an MPDU included in the A-MPDU format, the duration/ID field 1320 included in the MAC header of each MPDU may all be implemented to have the same value.

The address 1 field to address 4 field 1331 to 1334 may be set to implement specific fields among a BSSID field indicating a BSSID, a source address (SA) field indicating an SA, a destination address (DA) field indicating a DA, a transmitting address (TA) field indicating a transmitting STA address, and a receiving address (RA) field indicating a receiving STA address. Meanwhile, the address field implemented as the TA field may be set as a bandwidth signaling TA value, and in this case, the TA field may indicate that the frame includes additional information in the scrambling sequence. The bandwidth signaling TA may be expressed as a MAC address of the STA that transmits the corresponding frame, but an individual/group bit included in the MAC address may be set to a specific value, for example, 1.

The sequence control field 1340 is set to include a sequence number and a fragment number. The sequence number may indicate a sequence number allocated to the frame 1300. The fragment number may indicate the number of each fragment of the frame 1300.

The QoS control field 1350 includes information related to QoS.

The HT control field 1360 includes control information related to an HT scheme/EHT scheme.

The frame body 1370 may include data to be transmitted by the transmitting STA and/or the AP. In the frame body 1370, a body component excluding a MAC header and an FCS in a control frame, a management frame, an action frame, and/or a data frame to be transmitted may be implemented. When the frame 1300 is a management frame and/or an action frame, information elements included in the management frame and/or an action frame may be implemented in the frame body 1370.

The FCS field 1380 includes a bit sequence for CRC.

FIG. 14 is a block diagram showing an example of a frame control field format of a MAC frame.

Referring to FIG. 14, a frame control field 1400 includes a protocol version subfield 1405, a type subfield 1410, a subtype subfield 1415, and a To DS subfield 1420, a From DS subfield 1425, a More Fragment subfield 1430, a Retry subfield 1435, a Power Management subfield 1440, a More Data subfield 1445, a Protected Frame subfield 1450, and an Order subfield 1455.

The protocol version subfield 1405 may be set to indicate a version of a wireless LAN protocol applied to a corresponding MAC frame.

The type sub-field 1410 and the sub-type sub-field 1415 may be set to indicate information identifying a function of a frame including the corresponding frame control field 1400.

The To DS subfield 1420 and the From DS subfield 1425 may be determined according to a preset rule. For example, for a data frame directly transmitted from one STA to another STA in the same IBSS, a first value may be assigned to the To DS subfield 1420 and the From DS subfield 1425.

The More Fragment subfield 1430 may be set to indicate whether there is a fragment to be transmitted following the corresponding MAC frame.

The Retry Subfield 1435 may be set to indicate whether the corresponding MAC frame is based on retransmission of a previous frame.

The Power Management subfield 1440 may be set to indicate a power management mode of the STA.

The More Data subfield 1445 may be set to indicate whether a frame to be additionally transmitted exists.

The Protected Frame subfield 1450 may be set to include information indicating whether a frame body part has been processed by the encryption encapsulation algorithm.

Hereinafter, a resource unit (RU) used in the PPDU will be described. The resource unit may include a plurality of subcarriers (or tones). The RU may be used to transmit signals to multiple STAs based on an OFDMA technique. Also, an RU may be defined even when a signal is transmitted to one STA. The RU may be used for STF, LTF, data fields, and the like.

OFDMA communication based on an RU may be applied to the HE-PPDU shown in FIG. 12. That is, the RU described below may be applied to HE-STF, HE-LTF and data fields generated according to HE standards.

Figure 15:
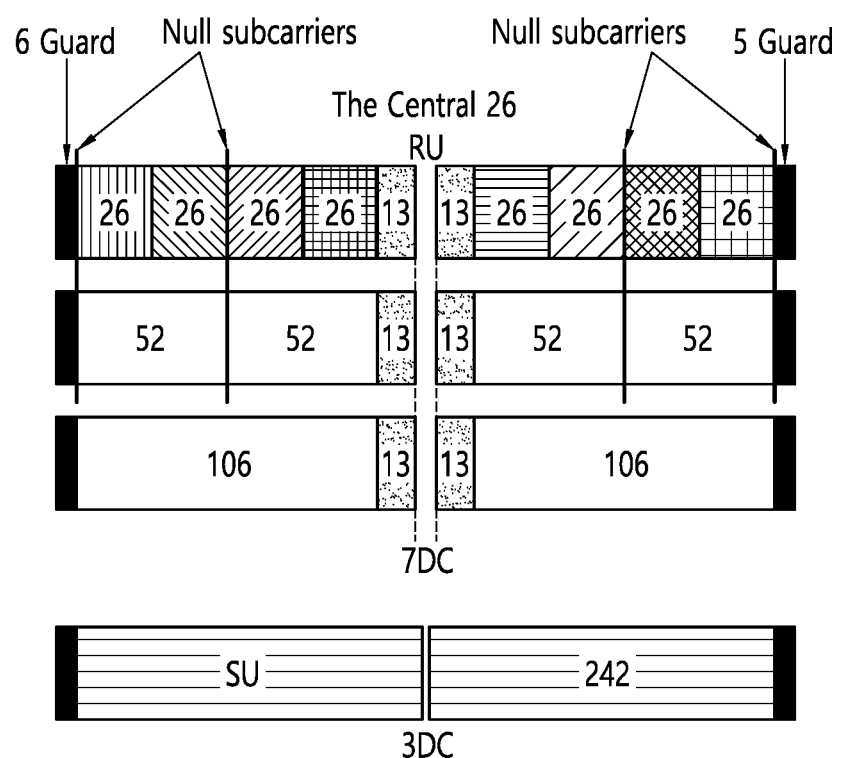
FIG. 15 is a diagram showing an arrangement of RUs used in a 20 MHz band.

FIG. 15 is a diagram showing an arrangement of RUs used in a 20 MHz band.

As shown in FIG. 15, resource units (RUs) corresponding to different numbers of tones (i.e., subcarriers) may be used to configure some fields of the HE-PPDU. For example, resources may be allocated in units of RUs shown for HE-STF, HE-LTF, and data fields.

As shown at the top of FIG. 15, 26-units (i.e., units corresponding to 26 tones) may be disposed. In the leftmost band of the 20 MHz band, 6 tones may be used as a guard band, and in the rightmost band of the 20 MHz band, 5 tones may be used as a guard band. In addition, 7 DC tones are inserted at a center band, that is, the DC band, and 26 units corresponding to 13 tones may exist on the left and right sides of the DC band. In addition, 26 units, 52 units, and 106 units may be allocated to other bands. Each unit may be assigned for a receiving station, i.e., a user.

Meanwhile, the RU arrangement of FIG. 15 is utilized not only in a situation for a plurality of users (MU), but also in a situation for a single user (SU). In this case, one 242-unit may be used, and in this case 3 DC tones may be inserted.

In the example of FIG. 15, RUs of various sizes, that is, 26-RU, 52-RU, 106-RU, 242-RU, etc., have been proposed. Since a specific size of the RUs may be expanded or increased, the embodiment is not limited to the specific size of each RU (i.e., the number of corresponding tones).

Figure 16:
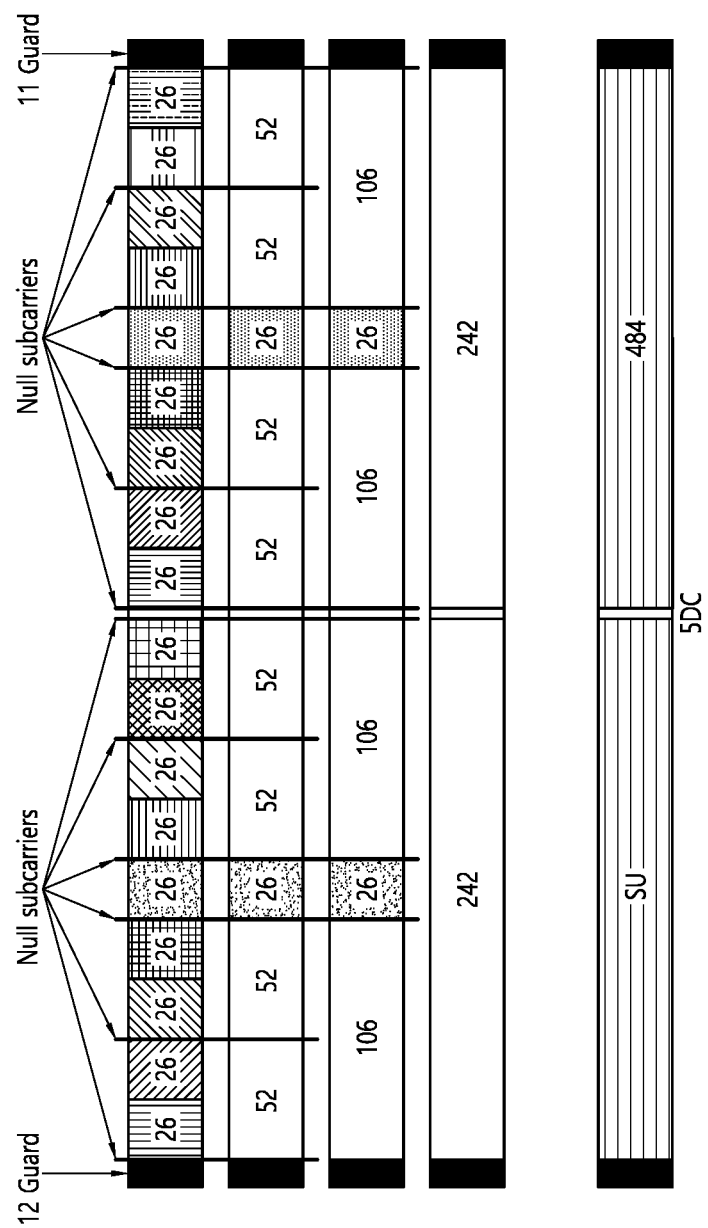
FIG. 16 is a diagram showing an arrangement of a resource unit (RU) used in a 40 MHz band.

FIG. 16 is a diagram showing an arrangement of a resource unit (RU) used in a 40 MHz band.

Similar to the use of RUs having various sizes in the example of FIG. 15, 26-RU, 52-RU, 106-RU, 242-RU, 484-RU, and the like may be used in the example of FIG. 16. In addition, 5 DC tones may be inserted into a center frequency, 12 tones may be used as a guard band at the leftmost band of the 40 MHz band, and 11 tones may be used as a guard band at the rightmost band of the 40 MHz band.

Also, as shown, when used for a single user, a 484-RU may be used. Meanwhile, the fact that the specific number of the RUs is changed is the same as the example of FIG. 15.

Figure 17:
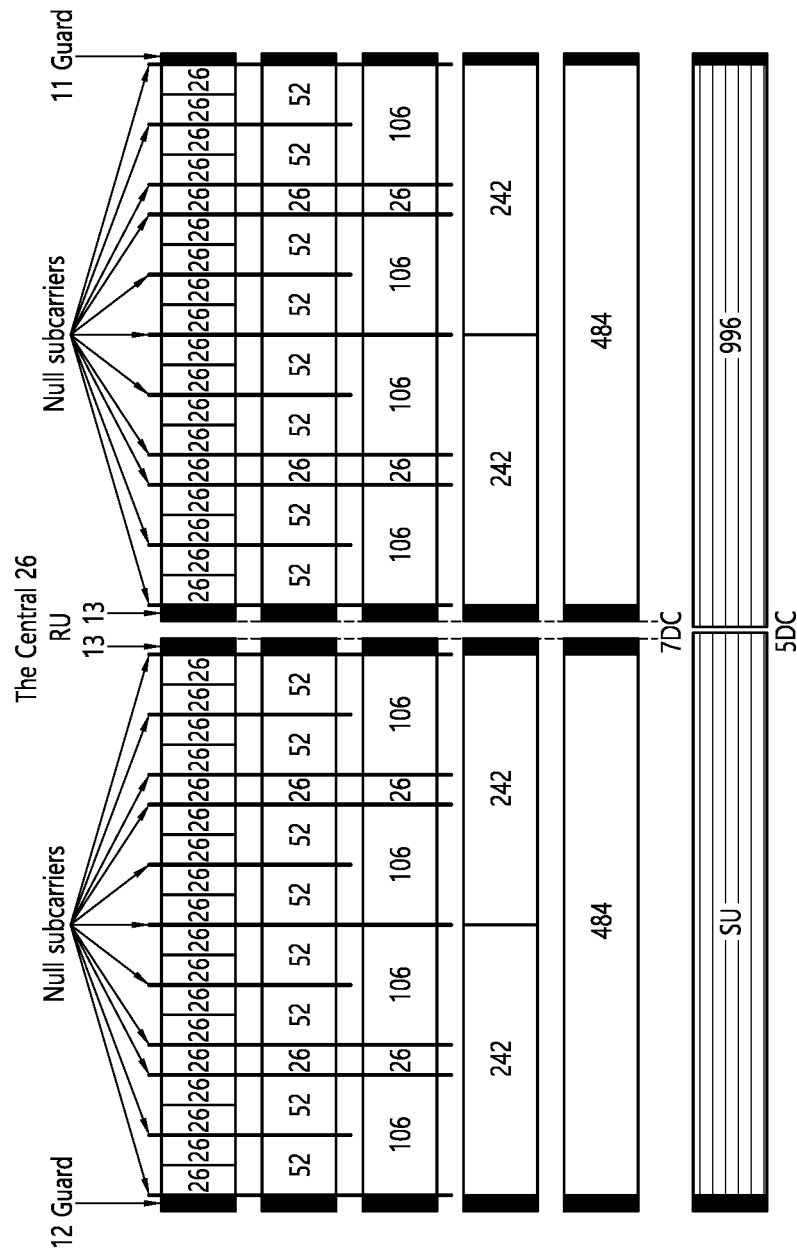
FIG. 17 is a view showing an arrangement of RUs used in an 80 MHz band.

FIG. 17 is a view showing an arrangement of RUs used in an 80 MHz band.

Figure 26:
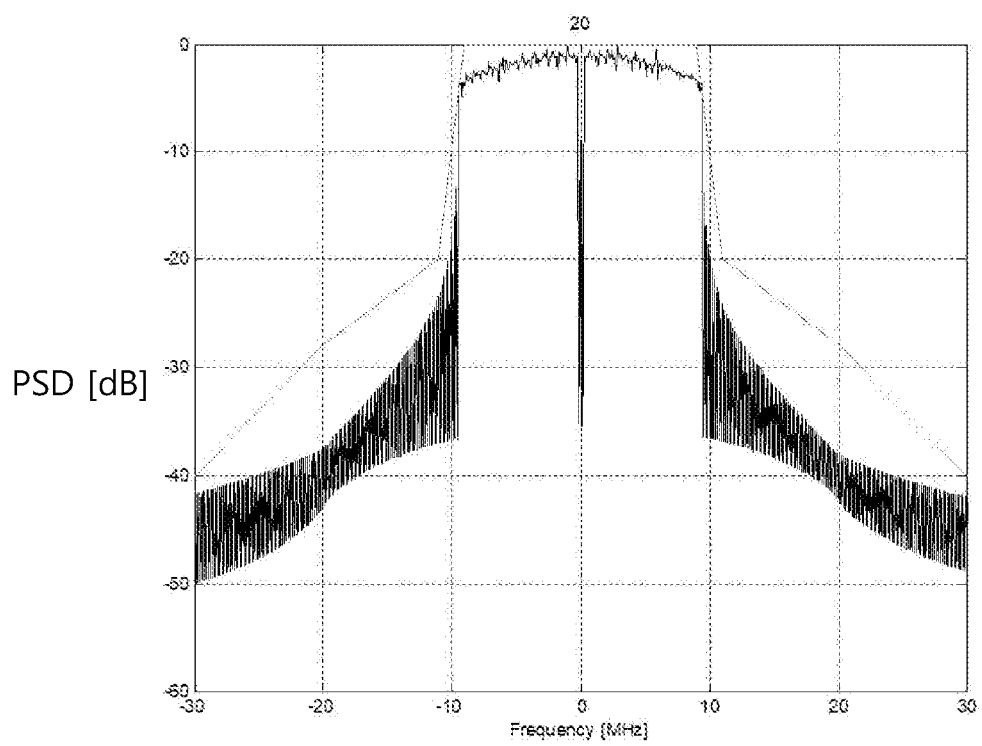
FIG. 26 shows a PSD within a conventional 20 MHz spectrum mask.

Similar to the use of RUs having various sizes in the examples of FIGS. 15 and 16, 26-RU, 52-RU, 106-RU, 242-RU, 484-RU, 996-RU, etc. may also be used in the example of FIG. 17. In addition, 7 DC tones may be inserted into a center frequency, 12 tones may be used as a guard band at the leftmost band of the 80 MHz band, and 11 tones may be used as a guard band at the rightmost band of the 80 MHz band. In addition, a 26-RU using 13 tones located on the left and right of the DC band may be used.

Further, as shown, when used for a single user, a 996-RU may be used, and in this case, 5 DC tones may be inserted.

Meanwhile, the fact that the specific number of the RUs is changed is the same as those of FIGS. 15 and 16.

The RUs shown in FIGS. 15 to 17 may be used for OFDMA-based communication. That is, any one RU (26/52/106/242-RU, etc.) shown in FIGS. 15 to 17 may be allocated to any one STA, and the other RU may be allocated to another STA. That is, MU communication is possible by allocating the RUs shown in FIGS. 15 to 17 to a plurality of STAs. MU communication may be applied to downlink communication as well as to uplink communication.

Figure 18:
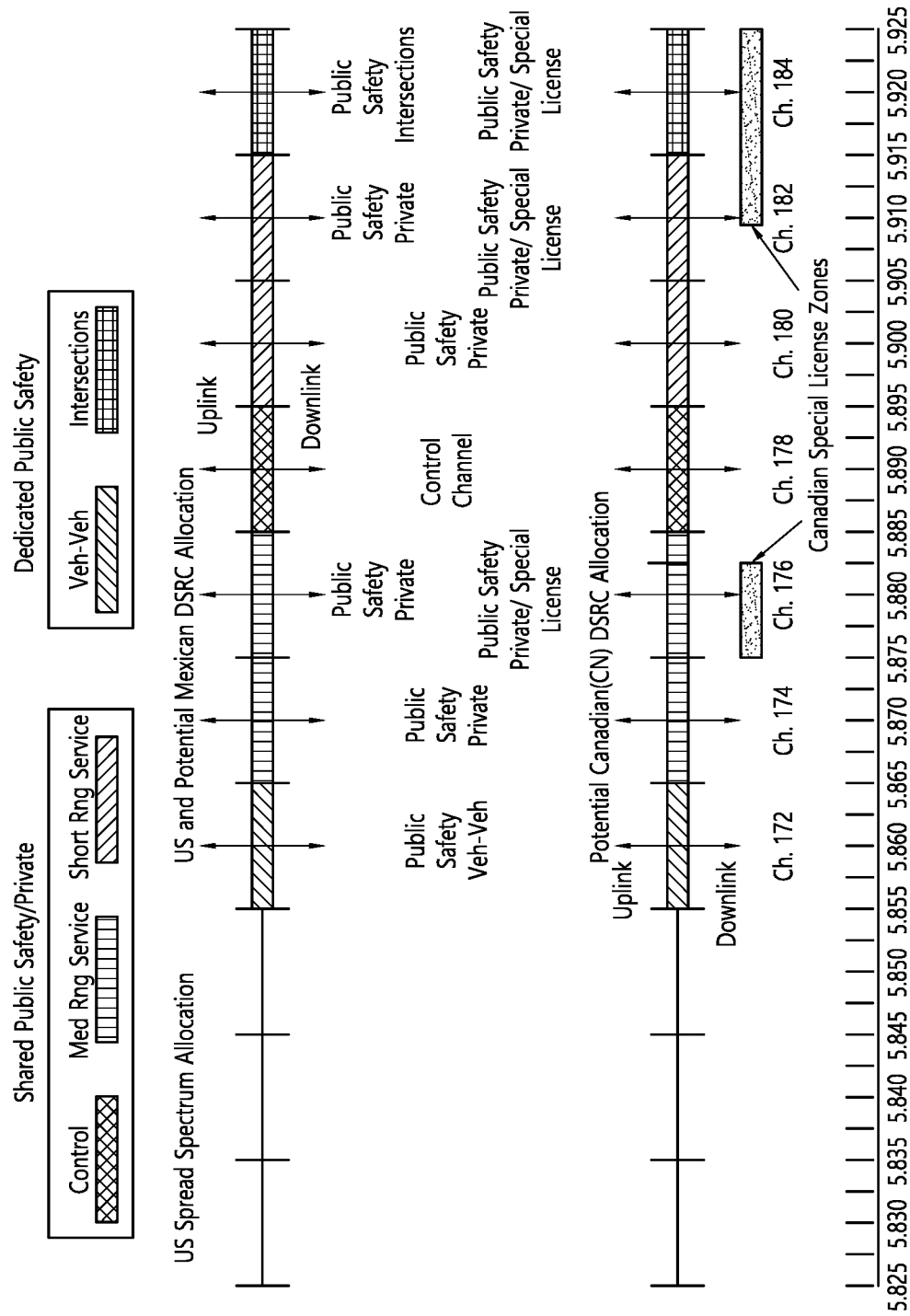
FIG. 18 shows a band plan of 5.9 GHz DSRC.

FIG. 18 shows a band plan of 5.9 GHz DSRC.

5.9 GHz DSRC is a short to medium range communications service that supports both public safety and private operations in roadside-to-vehicle and vehicle-to-vehicle communication environments. DSRC is devised as a complement to cellular communications by providing very high data transfer rates in situations where minimizing latency in the communication link and isolating relatively small communication zones are important. Additionally, PHY and MAC protocols are based on the revision of IEEE 802.11p for wireless access in a vehicular environment (WAVE).

<IEEE 802.11p>

802.11p uses PHY of 802.11a by performing 2× down-clocking on the PHY. That is, 802.11p transmits a signal by using a 10 MHz bandwidth and not a 20 MHz bandwidth. The numerology comparing 802.11a to 802.11p is as follows.

TABLE 1

|  | IEEE 802.11a | IEEE 802.11p |
| --- | --- | --- |
| Symbol duration | 4 us | 8 us |
| Guard period | 0.8 us | 1.6 us |
| Subcarrier spacing | 312.5 KHz | 156.25 KHz |
| OFDM subcarrier | 52 | 52 |
| Number of pilot | 4 | 4 |
| Default BW | 20 MHz | 10 MHz |
| Data rate (Mbps) | 6, 9, 12, 18, 24, 36, 48, 54 Mbps | 3, 4, 5, 6, 9, 12, 18, 24, 27 Mbps |
| Frequency band | 5 GHz ISM | 5.9 GHz dedicated |

Channels of a DSRC band include a control channel and a service channel, and each channel is capable of performing data transmission at 3, 4.5, 6, 9, 12, 18, 24, and 27 Mbps. If an option channel of 20 MHz exists, transmission at 6, 9, 12, 18, 24, 36, 48, and 54 Mbps may be performed. 6, 9, and 12 Mbps shall be supported in all services and channels. And, in case of a control channel, although a preamble is 3 Mbps, the message itself is 6 Mbps. In case channels 174 and 176 and channels 180 and 182 are authorized by a frequency regulation organization, the channel sets may be channels 175 and 181 of 20 MHz, respectively. The remaining channel shall be reserved for future usage. A short message or notification data, public safety alarm data, and so on, are broadcasted to all On Board Units (OBUs) through the control channel. The control channel and the service channel have been isolated in order to maximize efficiency and quality of service and to reduce interference between services.

Channel number 178 is a control channel, which automatically performed search and receives notification or data transmission, warning messages, and so on, from a Road Side Unit (RSU). All data of the control channel shall be transmitted within 200 ms and is repeated at a pre-defined cycle. In a control channel, public safety warnings have the highest priority over any other private messages. Private messages that are larger than 200 ms is transmitted through a service channel.

Private messages or long public safety messages, and so on, are transmitted through a service channel. In order to prevent collision (or conflict), a scheme for detecting channel status (i.e., Carrier Sense Multiple Access (CSMA)) is used prior to the transmission.

Figure 19:
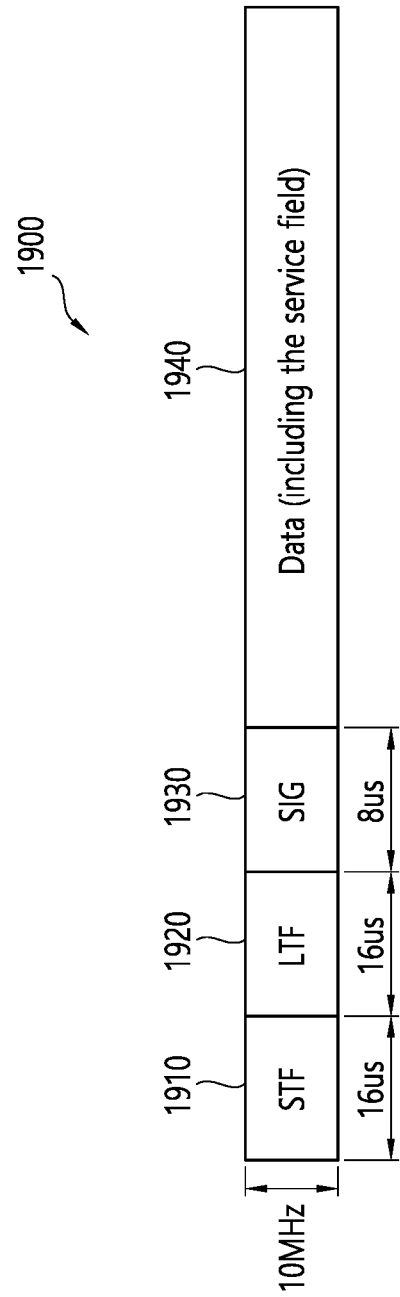
FIG. 19 shows a frame format of a frame according to the 802.11p standard.

FIG. 19 shows a frame format of a frame according to the 802.11p standard.

Referring to FIG. 19, a frame (or packet) according to the 802.11p standard (hereinafter referred to as an 11p frame (1900)) may support vehicle-to-vehicle communication at a 5.9 GHz band. An 11p frame (1900) may be configured by performing 2× down-clocking on an OFDM numerology according to the IEEE 802.11a standard for a 10 MHz band.

The 11p frame may include an STF (1910) for sync and AGC, an LTF (1920) for channel estimation, and/or a signal field (SIG field) (1930) including information on a data field (1940). Additionally, in FIG. 16, a data field (1940) may be configured to include 16 bits, which configure the service field.

The 802.11p standard may be applied by performing 2× down-clocking on an OFDM numerology for a 20 MHz bandwidth according to the 802.11a standard. Therefore, a symbol of the 802.11p frame (1900) may be configured to be longer than a symbol of an 802.11a frame. A symbol of the 802.11p frame (1900) may have a symbol duration of 8 us. The 11p frame (1900) may have a length that is two times longer than a frame according to the 802.11a standard in the aspect of time.

Hereinafter, an example of this specification is related to an NGV PPDU (or NGV frame). The NGV PPDU may be used in various wireless communication systems, and, for example, the NGV PPDU may be used in an IEEE 802.11bd wireless communication system. The NGV PPDU may be referred to by using various terms. For example, the NGV PPDU may be referred to by using various terms, such as a first type PPDU, a transmitting PPDU, a receiving PPDU, and a wireless LAN PPDU, and so on. Additionally, an NGV control field and an NGV data field may also be referred to by using various terms. For example, the NGV control field may be referred to by using various terms, such as a first control field, a transmitting control field, a receiving control field, a wireless LAN control field, and so on.

Figure 20:
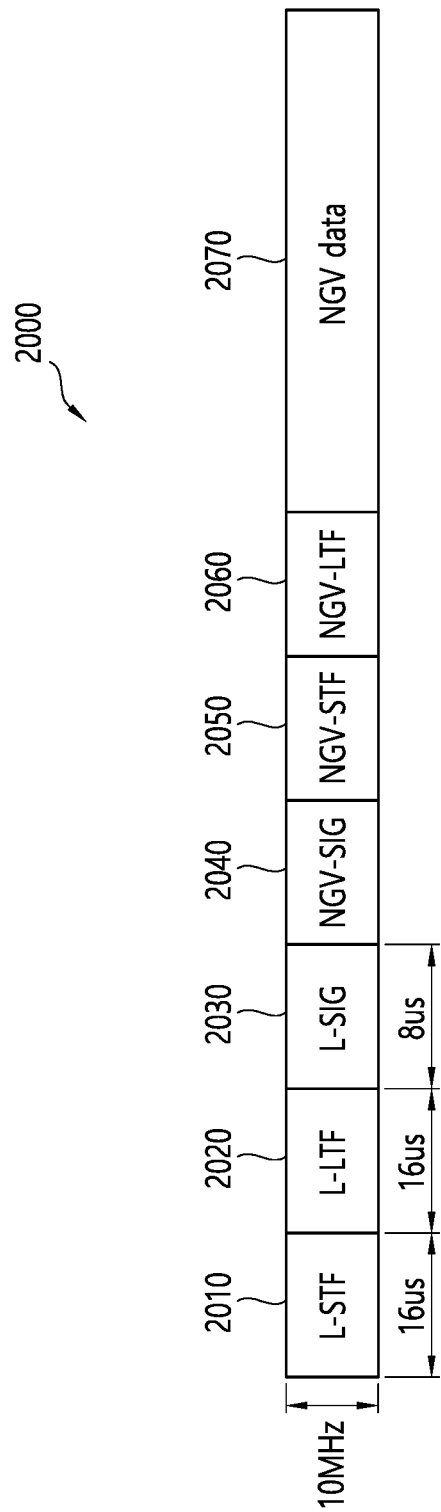
FIG. 20 shows an exemplary frame format of an NGV frame.

FIG. 20 shows an exemplary frame format of an NGV frame.

Referring to FIG. 20, an NGV frame (or NGV PPDU) (2000) may be proposed in order to enhance throughput and/or to support high speed in contrast with the 802.11p standard. The NGV frame (2000) may include a preamble part of the 11p frame for backward compatibility with the 802.11p standard.

In order to achieve backward compatibility with the 802.11p standard, which uses a 5.9 GHz band and symbol duration of 8 μs, the NGV frame (2000) may be configured by positioning legacy L-STF (2010), L-LTF (2020), and L-SIG (2030) fields, which configure the preamble of the 11p frame, at the beginning (or foremost end) of the NGV frame (2000). Additionally, the NGV frame (2000) may be configured of a symbols configuring NGV-SIG (2040), NGV-STF (2050), NGV-LTF (2060), and so on, which include control information for NGV, after the L-SIG field (2030), and NGV-data (2070). The aforementioned NGV control field may be the NGV-SIG (2040). And, the aforementioned NGV data field may be the NGV-data (2070).

FIG. 20 is merely an example of a frame format of an NGV frame. And, in order to differentiate the NGV frame, the NGV frame may be configured to have the structure shown in FIG. 21.

Figure 21:
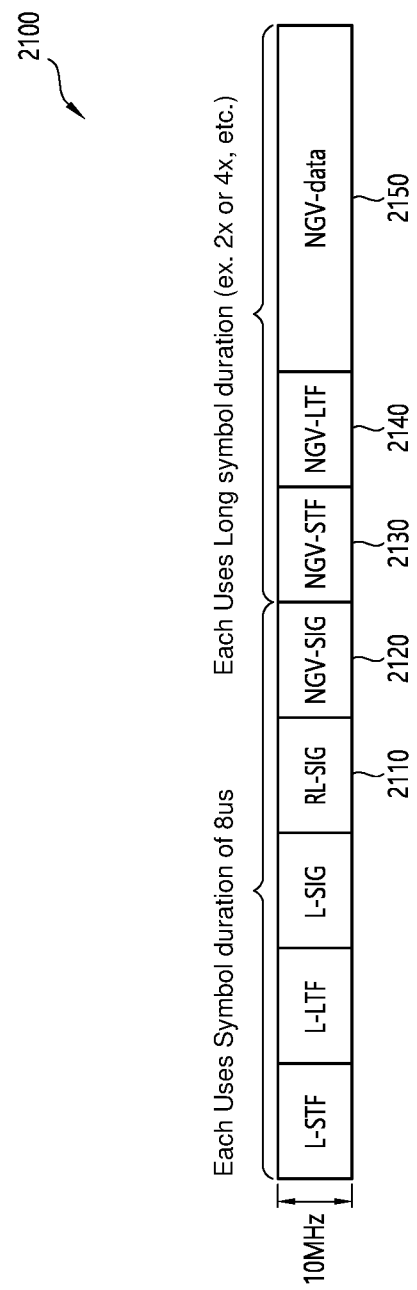
FIG. 21 shows another exemplary frame format of an NGV frame.

FIG. 21 shows another exemplary frame format of an NGV frame.

Referring to FIG. 21, an NGV frame (2100) may include an RL-SIG field (2110) for NGV frame format indication or one OFDM symbol for indication of information on an NGV frame. The RL-SIG field (2110) for indication on a NGV frame (2100) format or one OFDM symbol for indication of information on an NGV frame may be configured in front of an NGV control field. An NGV part may include NGV-STF (2120), NGV-LTF (2130), and/or NGV-data field (2140). The NGV part may be configured of symbols having a same length as a symbol length of an 11p frame (i.e., 8 μs). Additionally, the NGV part may also be configured of symbols having a length that is longer than the symbol length of an 11p frame.

According to an embodiment, an NGV PPDU (or NGV frame) may include information on a type of the NGV PPDU. The NGV PPDU may include a first L-SIG field (e.g., L-SIG field) and a second L-SIG field (e.g., RL-SIG field). The first L-SIG field and the second L-SIG field may include the same bit information. the first L-SIG field may be followed by the second L-SIG field. The information related to the NGV PPDU type may be included in the second L-SIG field and may be defined as a new field.

Hereinafter, the embodiment proposed in this specification may propose a tone configuration method for a case where the NGV-part uses a symbol length having the same length as the 11p frame (i.e., sub-carrier spacing of 156.25 kHz) and a case where the NGV-part uses a symbol length having a length 2 times longer than the 11p frame (i.e., sub-carrier spacing of 78.125 kHz).

More specifically, in a wireless LAN system, a transmitting STA may generate an NGV Physical Protocol Data Unit (PPDU). The NGV PPDU may include a legacy control field, a Next Generation Vehicular (NGV) network control field, and an NGV data field. The transmitting STA may transmit the NGV PPDU. A bandwidth and/or frequency spacing of the NGV PPDU may be configured by using various methods. The NGV PPDU may be transmitted based on a guard region having a first sub-carrier index range, a Direct Current (DC) region having a second sub-carrier index range, and a data and pilot region having a third sub-carrier index range.

Additionally, hereinafter, it may be verified whether or not a Power Spectral Density (PSD) according to each tone configuration is configured to be equal to or less than a designated value through a transmit spectrum mask. Herein, the transmit spectrum mask may also be referred to by using various terms, such as a transmit spectral mask, a spectrum mask, and/or a spectral mask (SM), and so on. Hereinafter, the term spectrum mask may be used for convenience in the description.

1. First Embodiment—in Case of Using 156.25 kHz Sub-Carrier Spacing

A. 10 MHz Band

A-i) Tones of the 10 MHz band may be configured of 64 tones, and a tone plan for 20 MHz of the 802.11ac standard may be configured by performing 2× down-clocking. Tones of the 10 MHz band may include 7 guard tones (4+3 tones) and 1 DC tone. Therefore, a signal may be transmitted through 56 tones.

A-ii) Available tone indexes considering the above-described guard tones and DC tone may be configured of [−28:−1, 1:28].

A-iii) Since 2× down-clocking is performed on the tone plan for 20 MHz of the 802.11ac standard, the method may be easily implemented. Additionally, since the same number of pilots (i.e., 4 tones) as the frame according to the 802.11ac standard is used, a tone plan (or structure) according to the 802.11ac standard may be used (or re-used).

A-iv) Unlike the above-described embodiment, a tone plan may be configured based on a spectrum mask for 20 MHz according to the 802.11ax standard and not a spectrum mask according to the 802.11ac standard. At this point, a spectrum mask for a 10 MHz bandwidth may be used by reducing the frequency region of the spectrum mask for the 20 MHz BW by 2 times.

A frequency range having 0 dBr may be −4.875 MHz~4.875 MHz. At this point, guard tones may be configured (or allocated) as (4,3) or (3,2). For example, in case the guard tones are configured as (4,3), left-side guard tones may be configured of 4 tones, and right-side guard tones may be configured of 3 tones. As another example, in case the guard tones are configured as (3,2), left-side guard tones may be configured of 3 tones, and right-side guard tones may be configured of 2 tones. The guard tones may be configured by using various methods. For example, the guard tones may be expressed in the aforementioned form of (4,3). In another example, the guard tones may also be expressed in a form of (4+3).

Therefore, in case of using a 20 MHz spectrum of the 802.11ax standard by reducing the frequency aspect by 2 times, in case the DC tone is configured (or allocated) as 1 tone, and in case the guard tones are configured as (4,3), 56 tones may be used as the available tones. And, in case the DC tone is configured (or allocated) as 1 tone, and in case the guard tones are configured as (3,2), 58 tones may be used as the available tones.

A-iv)-a Available tone indexes according to the number of guard tones and DC tones and a power spectral density (PSD) within a spectrum mask according to the tone configuration may be as described below.

A-iv)-a-i) In case the number of guard tones is (4,3), and in case the number of DC tones is 1, the available tone indexes may be configured of [−28:−1, 1:28]. More specifically, a tone of the 10 MHz band may be configured by using 4 pilot tones, which is the same as the tone configuration of 20 MHz according to the 802.11ac standard. The available tones of the 10 MHz band may include 52 data tones and 4 pilot tones.

Figure 22:
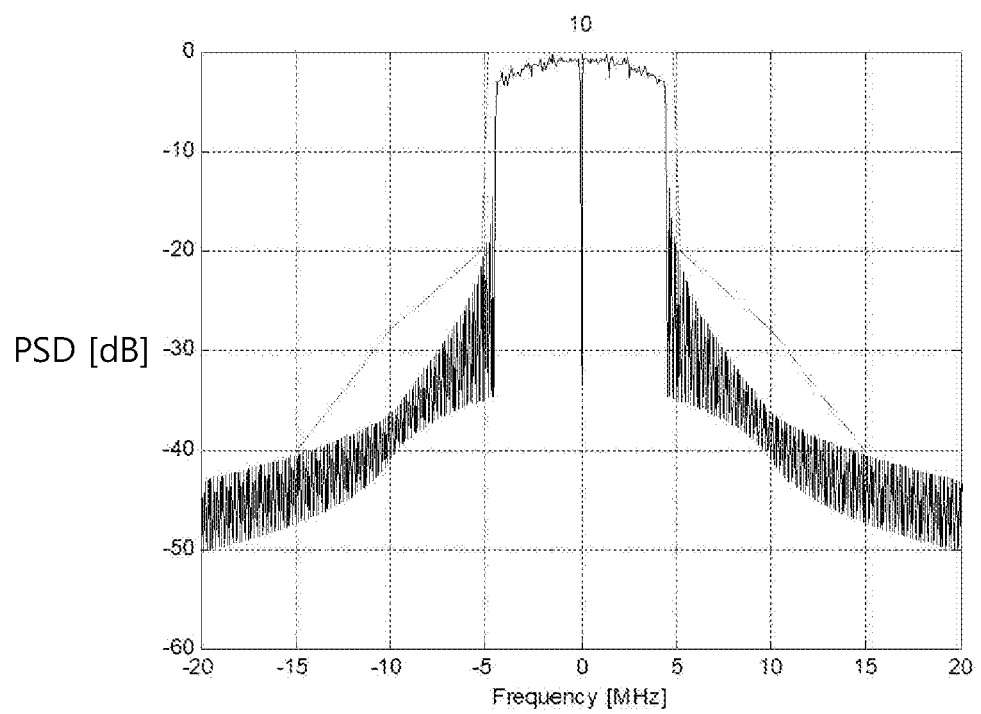
FIG. 22 shows a PSD within a spectrum mask.

FIG. 22 shows a PSD within a spectrum mask. Referring to FIG. 22, the PSD value according to the tone configuration having (4,3) guard tones and 1 DC tone may be smaller than the spectrum mask.

A-iv)-a-ii) In case the number of guard tones is (3,2), and in case the number of DC tones is 1, the available tone indexes may be configured of [−29:−1, 1:29]. More specifically, a tone of the 10 MHz band may be configured by using 4 pilot tones, which is the same as the tone configuration of 20 MHz according to the 802.11ac standard. The available tones of the 10 MHz band may include 54 data tones and 4 pilot tones.

According to the embodiment, in order to use the same interleaver as the related art standard, 6 carriers may be allocated as pilot. In this case, the available tones of the 10 MHz band may include 52 data tones and 6 pilot tones.

Figure 23:
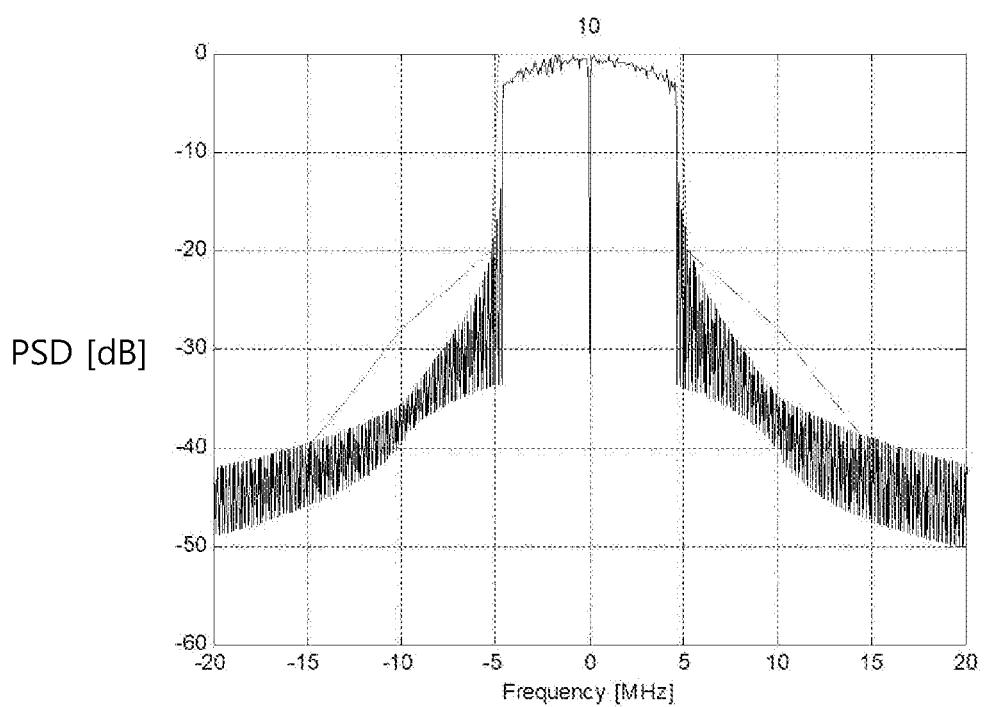
FIG. 23 shows a PSD within a spectrum mask.

FIG. 23 shows a PSD within a spectrum mask.

Referring to FIG. 23, the PSD value according to the tone configuration having (3,2) guard tones and 1 DC tone may be smaller than the spectrum mask. As shown in FIG. 23, the spectrum mask may be satisfied even when using a smaller number of guard tones. Therefore, since a smaller number of guard tones may be allocated as compared to the case where 2× down-clocking is performed on the tone configuration of the 802.11ac standard, a signal may be transmitted by using a data rate that is higher than a case where the spectrum mask according to the 802.11ac standard is considered.

B. 20 MHz Band

A bandwidth of the above-described NGV PPDU may be 20 MHz. Additionally, the NGV PPDU may be transmitted based on frequency spacing of 156.25 kHz. Hereinafter, a guard region having a first sub-carrier index range, a Direct Current (DC) region having a second sub-carrier index range, and a data and pilot region having a third sub-carrier index range of the NGV PPDU may be described.

B-i) Tones of the 20 MHz band may be configured of 128 tones. A detailed embodiment may hereinafter be described.

B-ii) CASE 1: A tone configuration method for 20 MHz by performing 2× down-clocking on a tone plan for a 40 MHz band of the 802.11ac standard.

Since down-clocking is performed on the tone plan for 40 MHz of the 802.11ac standard, the tone plan for 20 MHz may use (or re-use) the tone plan for 40 MHz of the 802.11ac standard. That is, 11 guard tone (e.g., 6+5 tones) and 3 DC tones may be included, and a signal may be transmitted by using 114 tones. In this case, the available tone indexes may be configured of [−58:−2, 2:58]. That is, the above-described NGV PPDU may be generated based on a sub-carrier index range of a VHT-PPDU, which is processed with 2× down-clocking. Therefore, the above-described first sub-carrier index range may be configured of [−64:−59, 59:63]. And, the second sub-carrier index range may be configured of [−1:1]. And, the third sub-carrier index range may be configured of [−58:−2, 2:58]. The number of pilot tones of the third sub-carrier index range may be variously configured. For example, the third sub-carrier index range may include 6 pilot tones, which is the same as the tone plan for the 40 MHz band of the 802.11ac standard.

Figure 24:
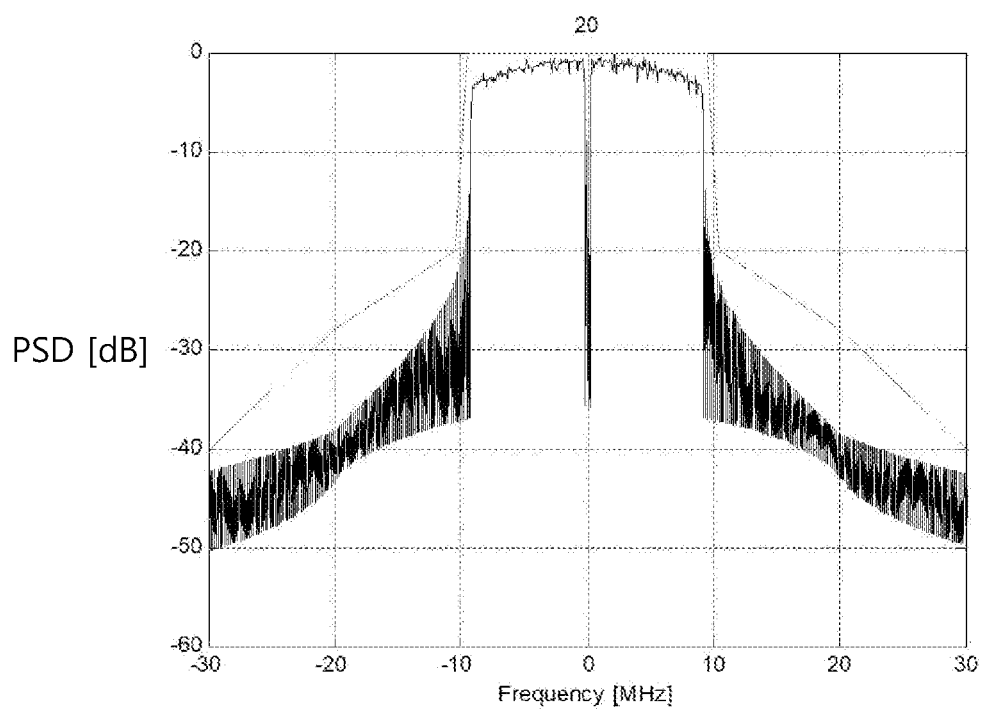
FIG. 24 shows a PSD within a spectrum mask.

FIG. 24 shows a PSD within a spectrum mask. Referring to FIG. 24, the PSD value according to the tone configuration having 11 guard tones and 3 DC tones at 20 MHz may be smaller than the spectrum mask.

Since the method for configuring the tones for 20 MHz by performing 2× down-clocking on the tone plan for the 40 MHz band of the 802.11ac standard, uses the existing tone plan of the 802.11ac standard by performing 2× down-clocking, the method may be easily implemented.

According to the embodiment, by configuring the number of DC tones to 1 tone, in order to allow a larger number of available tones to be used in the above-described tone configuration, the tones for 20 MHz may be configured. The method for configuring 1 DC tone may satisfy the spectrum mask shown in FIG. 24. Additionally, according to the method for configuring 1 DC tone, a signal may be transmitted by using 116 tones, which 2 tones greater than the method for configuring tones for 20 MHz by performing 2× down-clocking on the tone plan for the 40 MHz band of the 802.11ac standard. In this case, the available tone indexes may be configured of [−58:−1, 1:58]. Therefore, the above-described first sub-carrier index range may be configured of [−64:−59, 59:63]. And, the second sub-carrier index range may be configured of [0]. And, the third sub-carrier index range may be configured of [−58:−1, 1:58]. In the tone configuration according to the method for configuring 1 DC tone, the number of pilot tones may be variously configured.

For example, the pilot tones may be configured to be the same as the 40 MHZ tone configuration of the 802.11ac standard. At this point, 110 data tones and 6 pilot tones may be configured.

In another example, in order to use the conventional (or existing) interleaver, 108 data tones and 8 pilot tones may be configured.

B-iii) CASE 2: A method for configuring a tone plan considering a conventional 20 MHz spectrum mask (e.g., spectrum mask of 802.11a, 802.11n or 802.11ac) as the spectrum mask for 20 MHz.

Figure 25:
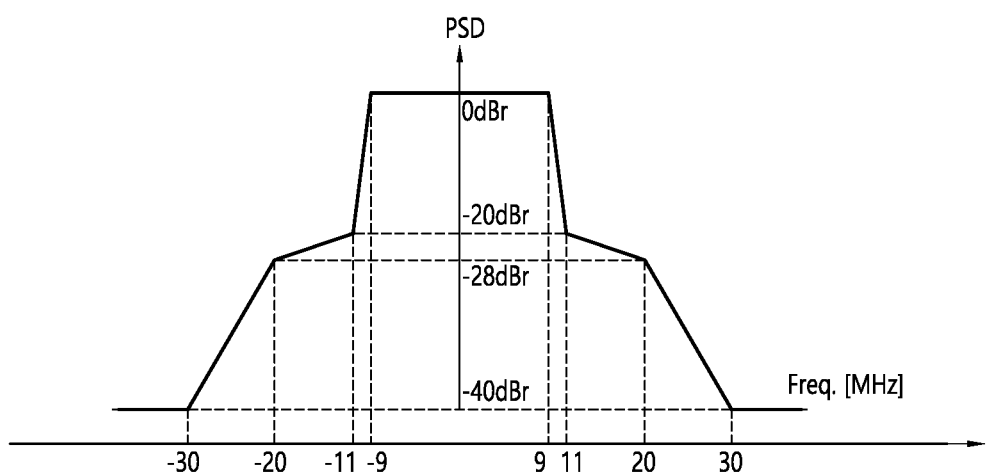
FIG. 25 shows a conventional 20 MHz spectrum mask.

B-iii)-a FIG. 25 shows a conventional 20 MHz spectrum mask (e.g., 11a, 11n, 11ac).

As shown in the drawing, the PSD value of the spectrum mask shown in FIG. 25 may be configured as −40 dBr at a −30 MHz position and may be configured as −28 dBr at a −20 MHz position. And, the PSD value of the spectrum mask shown in FIG. 25 increases linearly from the −30 MHz position to the −20 MHz position. Additionally, the PSD value of the spectrum mask shown in FIG. 25 may be configured as −20 dBr at a −11 MHz position. And, the PSD value of the spectrum mask shown in FIG. 25 increases linearly from the −20 MHz position to the −11 MHz position. Additionally, the PSD value of the spectrum mask shown in FIG. 25 may be configured as 0 dBr at a −9 MHz position. And, the PSD value of the spectrum mask shown in FIG. 25 increases linearly from the −11 MHz position to the −9 MHz position. Additionally, the PSD value of the spectrum mask shown in FIG. 25 may be configured as 0 dBr at a 9 MHz position. And, the PSD value of the spectrum mask shown in FIG. 25 is maintained consistently from the −9 MHz position to the 9 MHz position. Additionally, the PSD value of the spectrum mask shown in FIG. 25 may be configured as −20 dBr at an 11 MHz position. And, the PSD value of the spectrum mask shown in FIG. 25 decreases linearly from the 9 MHz position to the 11 MHz position. Additionally, the PSD value of the spectrum mask shown in FIG. 25 may be configured as −28 dBr at a 20 MHz position. And, the PSD value of the spectrum mask shown in FIG. 25 decreases linearly from the 11 MHz position to the 20 MHz position. Furthermore, the PSD value of the spectrum mask shown in FIG. 25 may be configured as −40 dBr at a 30 MHz position. And, the PSD value of the spectrum mask shown in FIG. 25 decreases linearly from the 20 MHz position to the 30 MHz position.

The PSD value shall satisfy 0 dBr within 18 MHz (−9 MHz~9 MHz). Therefore, when considering sub-carrier spacing of 156.25 kHz, 115.2 tones may be available within the aforementioned range (18 MHz). By allocating various numbers of guard tones while considering signal energy leakage, the transmitting STA may transmit a signal. At this point, 1 tone or 3 tones may be allocated as the DC tone(s).

B-iii)-a-i) Just as the 20 MHz tone plan of the 802.11ac standard, the tones may be configured by allocating 7 guard tones and 1 DC tone. In case of allocating a minimum number of guard tones and DC tones, the transmitting STA may transmit a signal by using a maximum of 120 tones as the available tones. Therefore, the method of using a maximum of 120 tones as the available tones may increase the data rate and throughput. In case of allocating 3 tones as the DC tones, 118 tones may be used. The method of using 120 tones as the available tones may enhance the throughput by 2 times greater than the case of using the conventional tone plan (e.g., 56 tones) according to 20 MHz. The available tone indexes according to the number of DC tones may be variously configured.

For example, in case 1 DC tone is used, the available tone indexes may be configured of [−60:−1, 1:60]. In the tone configuration, the number of pilot tones may be variously configured. For example, just as the 20 MHz transmission of the 802.11a/802.11n/802.11ac standards, by allocating 4 pilots (or pilot tones), 116 tones may be used as data tones. In another example, by allocating 6 tones as pilots (or pilot tones), just as the 128-tone configuration, 114 tones may be used as the data tones. In yet another example, in order to use the conventional (or existing) interleaver, 108 data tones and 12 pilot tones may be configured.

In another example, in case 3 DC tones are used, the available tone indexes may be configured of [−60:−2, 2:60]. In the tone configuration, the number of pilots (or pilot tones) may be variously configured. For example, just as the 20 MHz transmission of the 802.11a/802.11n/802.11ac standards, by allocating 4 pilots (or pilot tones), 114 tones may be used as data tones. In another example, by allocating 6 tones as pilots (or pilot tones), just as the 128-tone configuration, 112 tones may be used as the data tones. In yet another example, in order to use the conventional (or existing) interleaver, 108 data tones and 10 pilot tones may be configured.

FIG. 26 shows a PSD within a conventional 20 MHz spectrum mask (e.g., 11a, 11n, 11ac).

Referring to FIG. 26, the PSD value according to the tone configuration having 3 DC tones at 20 MHz may be smaller than the conventional 20 MHz spectrum mask.

B-iii)-a-ii) A tone plan for 20 MHz may be configured by applying a 40 MHz tone plan of the 802.11ac standard. That is, by performing 2× down-clocking on the 40 MHz tone plan of the 802.11ac standard, tones for 20 MHz may be configured. Therefore, a signal may be transmitted by using a tone plan including 11 guard tones (e.g., 6+5 tones) and 3 DC tones. At this point, the number of available tones within one symbol may be equal to 114. In case 1 tone is allocated as the DC tone, a signal may be transmitted by using a total of 116 tones by additionally using 2 more tones. In this case, a maximum number of tones may be used. Available tone indexes according to the number of DC tones may be variously configured.

For example, in case 1 DC tone is used, the available tone indexes may be configured of [−58:−1, 1:58]. In the tone configuration, the number of pilots (or pilot tones) may be variously configured. For example, just as the 20 MHz transmission of the 802.11a/802.11n/802.11ac standards, by allocating 4 pilots (or pilot tones), 112 tones may be used as data tones. In another example, by allocating 6 tones as pilots (or pilot tones), just as the 128-tone configuration, 110 tones may be used as the data tones. In yet another example, in order to use the conventional (or existing) interleaver, 108 data tones and 8 pilot tones may be configured.

In another example, in case 3 DC tones are used, the available tone indexes may be configured of [−58:−2, 2:58]. In the tone configuration, the number of pilots (or pilot tones) may be variously configured. For example, just as the 20 MHz transmission of the 802.11a/802.11n/802.11ac standards, by allocating 4 pilots (or pilot tones), 110 tones may be used as data tones. In another example, in order to use the conventional (or existing) interleaver, 108 data tones and 10 pilot tones may be configured.

Figure 27:
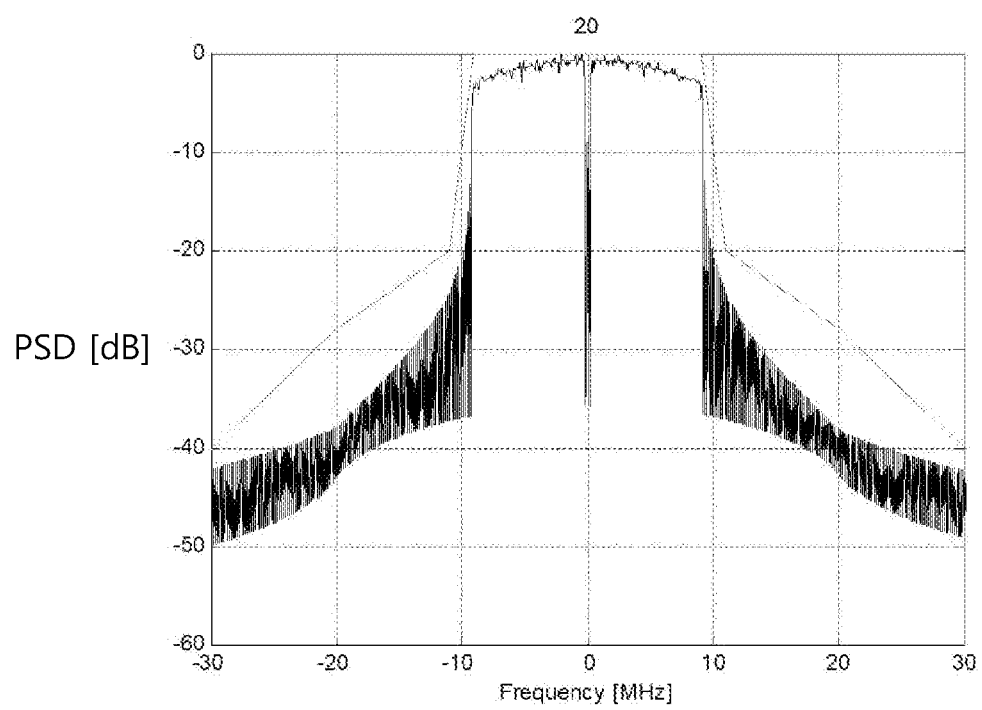
FIG. 27 shows a PSD within a conventional 20 MHz spectrum mask.

FIG. 27 shows a PSD within a conventional 20 MHz spectrum mask (e.g., 11a, 11n, 11ac).

Referring to FIG. 27, the PSD value according to the tone configuration having 11 guard tones and 3 DC tones at 20 MHz may be smaller than the conventional 20 MHz spectrum mask.

B-iii)-a-iii) In case of using a spectrum mask in order to reduce signal energy leakage as much as possible, the Tx power may deviate from the spectrum mask. If more guard tones are configured, cases where the Tx power deviates from the spectrum mask may be reduced. Therefore, a signal may be transmitted by using a tone plan, wherein 13 tones (7+6 tones) are allocated as the guard tones, and wherein 1 tone or 3 tones is/are allocated as the DC tone(s). At this point, the number of available tones may be equal to 114 tones or 112 tones in accordance with the number of DC tones.

For example, in case 1 DC tone is used, the available tone indexes may be configured of [−57:−1, 1:57]. In the tone configuration, the number of pilots (or pilot tones) may be variously configured. For example, just as the 20 MHz transmission of the 802.11a/802.11n/802.11ac standards, by allocating 4 pilots (or pilot tones), 110 tones may be used as data tones. In another example, in order to use the conventional (or existing) interleaver, 108 data tones and 8 pilot tones may be configured.

In another example, in case 3 DC tones are used, the available tone indexes may be configured of [−57:−2, 2:57]. In the tone configuration, the number of pilots (or pilot tones) may be variously configured. For example, just as the 20 MHz transmission of the 802.11a/802.11n/802.11ac standards, by allocating 4 pilots (or pilot tones), 108 tones may be used as data tones. At this point, a size of the conventional (or existing) interleaver may be maintained. In another example, just as the 128-tone configuration, 106 data tones and 6 pilot tones may be configured.

B-iii)-b Unlike the description presented above, tones of 20 MHz may be configured while considering a spectrum mask of the 802.11ax standard.

B-iii)-b-i) CASE 1: A method for transmitting a signal by using a 40 MHz tone plan in a 20 MHz spectrum mask of the 802.11ax standard. That is, a signal may be transmitted by using a total of 114 tones including 11 guard tones (6+5 tones) and 3 DC tones. In case 1 tone is allocated as the DC tone, more available tones may be used. Available tone indexes may be variously configured in accordance with the number of DC tones.

For example, in case 1 DC tone is used, the available tone indexes may be configured of [−58:−1, 1:58]. In the tone configuration, the number of pilots (or pilot tones) may be variously configured. For example, just as the 20 MHz transmission of the 802.11a/802.11n/802.11ac standards, by allocating 4 pilots (or pilot tones), 112 tones may be used as data tones. In another example, by allocating 6 tones as pilots (or pilot tones), just as the 128-tone configuration, 110 tones may be used as the data tones. In yet another example, in order to maintain the size of the conventional (or existing) interleaver, 108 data tones and 8 pilot tones may be configured.

Figure 28:
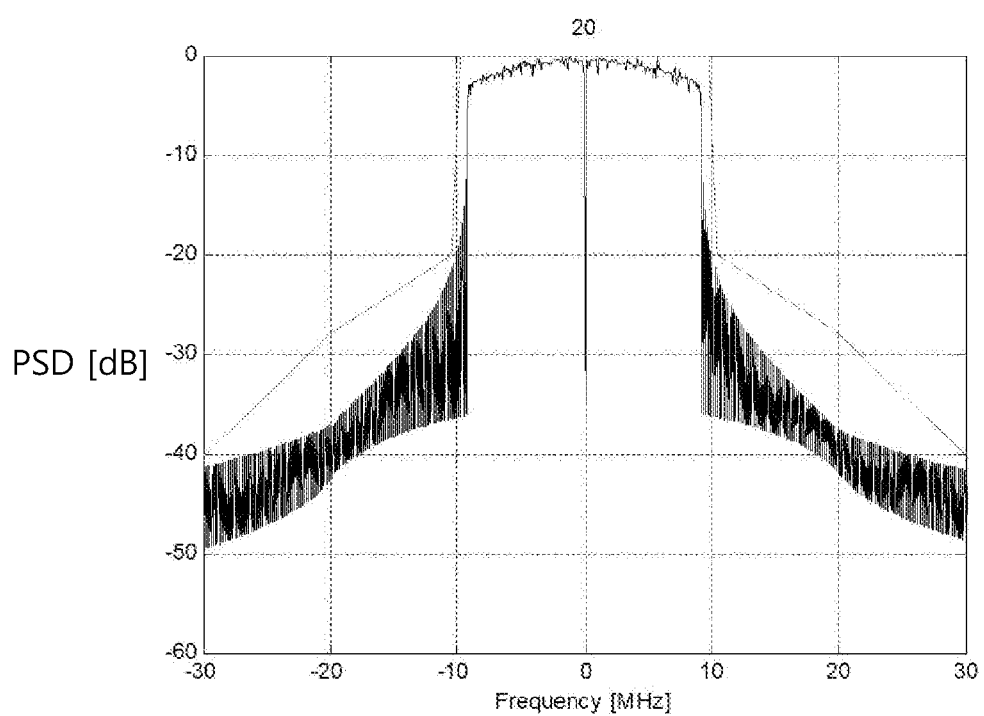
FIG. 28 shows a PSD within a 20 MHz spectrum mask of the 802.11ax standard.

FIG. 28 shows a PSD within a 20 MHz spectrum mask of the 802.11ax standard.

Referring to FIG. 28, the PSD value according to the tone configuration having 11 guard tones and 1 DC tone at 20 MHz may be smaller than the spectrum mask.

In another example, in case 3 DC tones are used, the available tone indexes may be configured of [−58:−2, 2:58]. In the tone configuration, the number of pilots (or pilot tones) may be variously configured. For example, just as the 20 MHz transmission of the 802.11a/802.11n/802.11ac standards, by allocating 4 pilots (or pilot tones), 110 tones may be used as data tones. In another example, by allocating 6 tones as pilots (or pilot tones), just as the 128-tone configuration, 108 tones may be used as the data tones. At this point, the size of the conventional (or existing) interleaver may be configured maintained.

Figure 29:
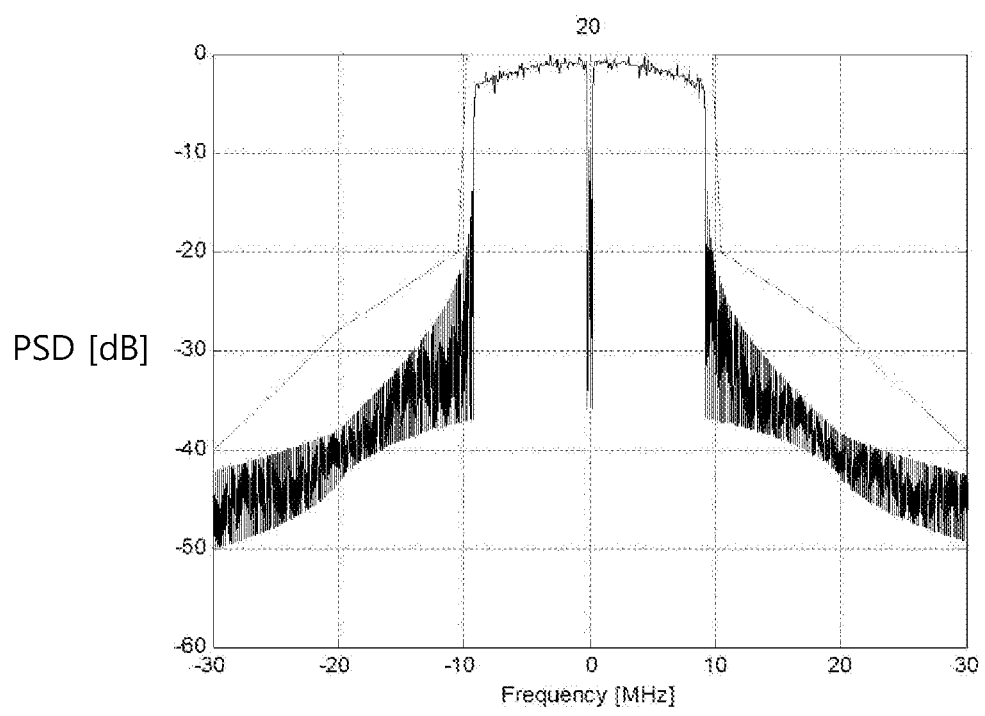
FIG. 29 shows a PSD within a 20 MHz spectrum mask of the 802.11ax standard.

FIG. 29 shows a PSD within a 20 MHz spectrum mask of the 802.11ax standard.

Referring to FIG. 29, the PSD value according to the tone configuration having 11 guard tones and 3 DC tones at 20 MHz may be smaller than the spectrum mask.

B-iii)-b-ii) CASE 2: A method for configuring tones by using the same number of guard tones as the number of guard tones (e.g., 4+3 tones) of 20 MHz tone plan of the 802.11ac standard. At this point, 1 tone or 3 tones may be allocated as the DC tone(s) to the tones of the 10 MHz band. Therefore, the number of available tones may be equal to 120 tones or 118 tones in accordance with the number of DC tones.

By using a small number of guard tones as in the 20 MHz tone plan of the 802.11ac standard, the number of tones that are available for usage is increased, thereby enhancing the data rate/throughput.

Available tone indexes may be variously configured in accordance with the number of DC tones.

For example, in case 1 DC tone is used, the available tone indexes may be configured of [−60:−1, 1:60]. In the tone configuration, the number of pilots (or pilot tones) may be variously configured. For example, just as the 20 MHz transmission of the 802.11a/802.11n/802.11ac standards, by allocating 4 pilots (or pilot tones), 116 tones may be used as data tones. In another example, by allocating 6 tones as pilots (or pilot tones), just as the 128-tone configuration, 114 tones may be used as the data tones. In yet another example, in order to maintain the size of the conventional (or existing) interleaver, 108 data tones and 12 pilot tones may be configured.

In another example, in case 3 DC tones are used, the available tone indexes may be configured of [−60:−2, 2:60]. In the tone configuration, the number of pilots (or pilot tones) may be variously configured. For example, just as the 20 MHz transmission of the 802.11a/802.11n/802.11ac standards, by allocating 4 pilots (or pilot tones), 114 tones may be used as data tones. In another example, by allocating 6 tones as pilots (or pilot tones), just as the 128-tone configuration, 112 tones may be used as the data tones. In yet another example, in order to maintain the size of the conventional (or existing) interleaver, by allocating 10 pilots (or pilot tones), 108 tones may be used as data tones.

Figure 30:
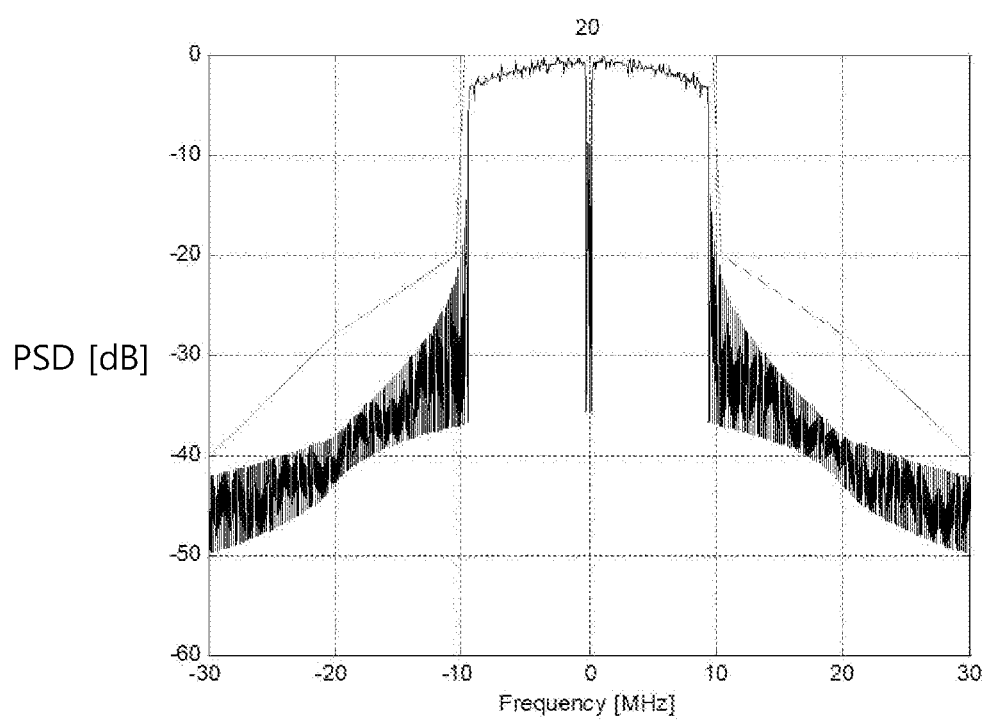
FIG. 30 shows a PSD within a 20 MHz spectrum mask of the 802.11ax standard.

FIG. 30 shows a PSD within a 20 MHz spectrum mask of the 802.11ax standard.

Referring to FIG. 30, the PSD value according to the tone configuration having 7 guard tones and 3 DC tones at 20 MHz may be smaller than the spectrum mask.

B-iii)-b-iii) CASE 3: The number of tones that may be used at a BW (i.e., 19.5 MHz) satisfying 0 dbr within a range that satisfies the 20 MHz spectrum mask of the 802.11ax standard may be equal to 124.8 tones. Therefore, 62.4 tones may be used centering around the center frequency (Fc). Therefore, in order to use a maximum number of tones, various number of tones may be allocated to the guard tones and DC tones, so as to transmit a signal.

In order to use a maximum number of tones, tones for a symbol may be configured by applying 5 guard tones (3+2 tones) and 1 DC tone or 3 DC tones to the tone plan of 20 MHz. At this point, the number of available tones may be 122 tones or 120 tones in accordance with the number of DC tones.

For example, in case 1 DC tone is used, the available tone indexes may be configured of [−61:−1, 1:61]. In the tone configuration, the number of pilots (or pilot tones) may be variously configured. For example, just as the 20 MHz transmission of the 802.11a/802.11n/802.11ac standards, by allocating 4 pilots (or pilot tones), 118 tones may be used as data tones. In another example, by allocating 6 tones as pilots (or pilot tones), just as the 128-tone configuration, 116 tones may be used as the data tones. In yet another example, in order to maintain the size of the conventional (or existing) interleaver, 108 data tones and 14 pilot tones may be configured.

In another example, in case 3 DC tones are used, the available tone indexes may be configured of [−61:−2, 2:61]. In the tone configuration, the number of pilots (or pilot tones) may be variously configured. For example, just as the 20 MHz transmission of the 802.11a/802.11n/802.11ac standards, by allocating 4 pilots (or pilot tones), 116 tones may be used as data tones. In another example, by allocating 6 tones as pilots (or pilot tones), just as the 128-tone configuration, 114 tones may be used as the data tones. In yet another example, in order to maintain the size of the conventional (or existing) interleaver, 108 data tones and 12 pilot tones may be configured.

Figure 31:
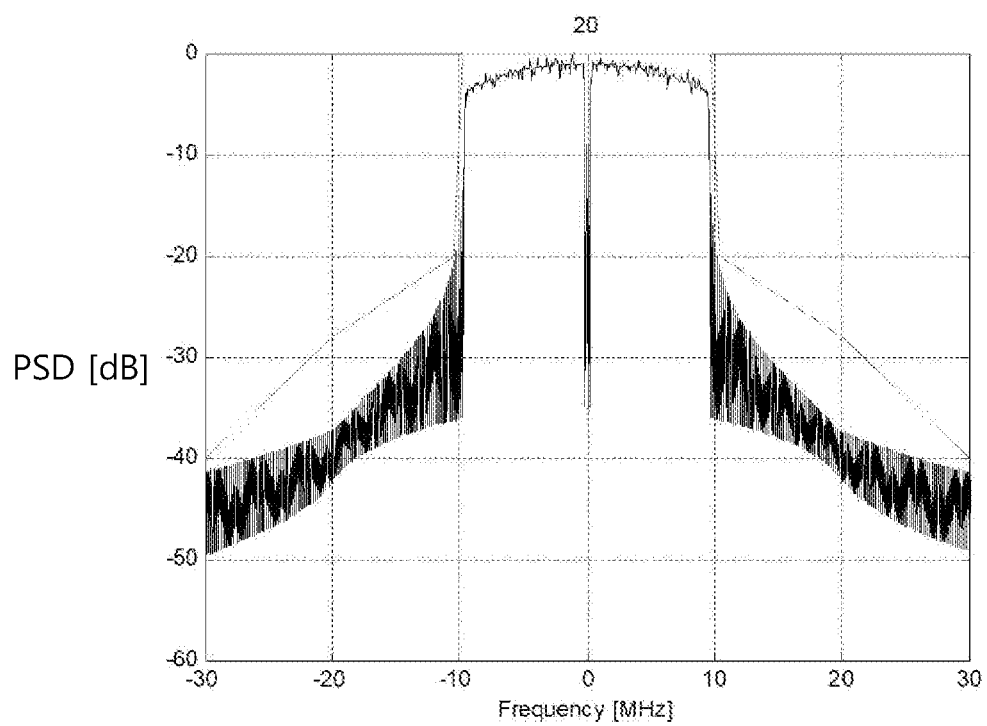
FIG. 31 shows a PSD within a 20 MHz spectrum mask of the 802.11ax standard.

FIG. 31 shows a PSD within a 20 MHz spectrum mask of the 802.11ax standard.

Referring to FIG. 31, the PSD value according to the tone configuration having 5 guard tones and 3 DC tones may be smaller than the 20 MHz spectrum mask of the 802.11ax standard.

By configuring guard tones and DC tones by using a minimum number of tones, the method for configuring 20 MHz tones according to CASE 3 may increase the number of available tones and may also enhance data rate and throughput.

2. Second Embodiment—in Case of Using 78.125 kHz Sub-Carrier Spacing

2.C. 10 MHz Band

C-i) Tones of a 10 MHz band may be configured of 128 tones. A detailed embodiment may hereinafter be described.

C-ii) CASE 1: A method for configuring tones of 10 MHz by applying a 10 MHz spectrum mask of the 802.11p standard and by applying a tone plan that is configured for the 40 MHz transmission of the 802.11ac standard.

C-ii)-a A tone plan including 11 guard tones (e.g., 6+5 tones) and 3 DC tones may be configured. At this point, a signal may be transmitted by using 114 tones within one symbol.

C-ii)-b In order to allow a larger number of available tones to be used in the above-described tone configuration, 1 tone may be used as the DC tone. At this point, the number of available tones may be equal to 116 tones.

C-ii)-c Available tone indexes may be variously configured in accordance with the DC tones.

For example, in case 1 DC tone is used, the available tone indexes may be configured of [−58:−1, 1:58]. In the tone configuration, the number of pilots (or pilot tones) may be variously configured. For example, just as the 10 MHz transmission of the 802.11p standard, by allocating 4 pilots (or pilot tones), 112 tones may be used as data tones. In another example, by allocating 6 tones as pilots (or pilot tones), just as the 128-tone configuration, 110 tones may be used as the data tones. In yet another example, in order to maintain the size of the conventional (or existing) interleaver, 108 data tones and 8 pilot tones may be configured.

In another example, in case 3 DC tones are used, the available tone indexes may be configured of [−58:−2, 2:58]. In the tone configuration, the number of pilots (or pilot tones) may be variously configured. For example, just as the 10 MHz transmission of the 802.11p standard, by allocating 4 pilots (or pilot tones), 110 tones may be used as data tones. In another example, by allocating 6 tones as pilots (or pilot tones), just as the 128-tone configuration, 108 tones may be used as the data tones. At this point, the size of the conventional (or existing) interleaver may be maintained.

Figure 32:
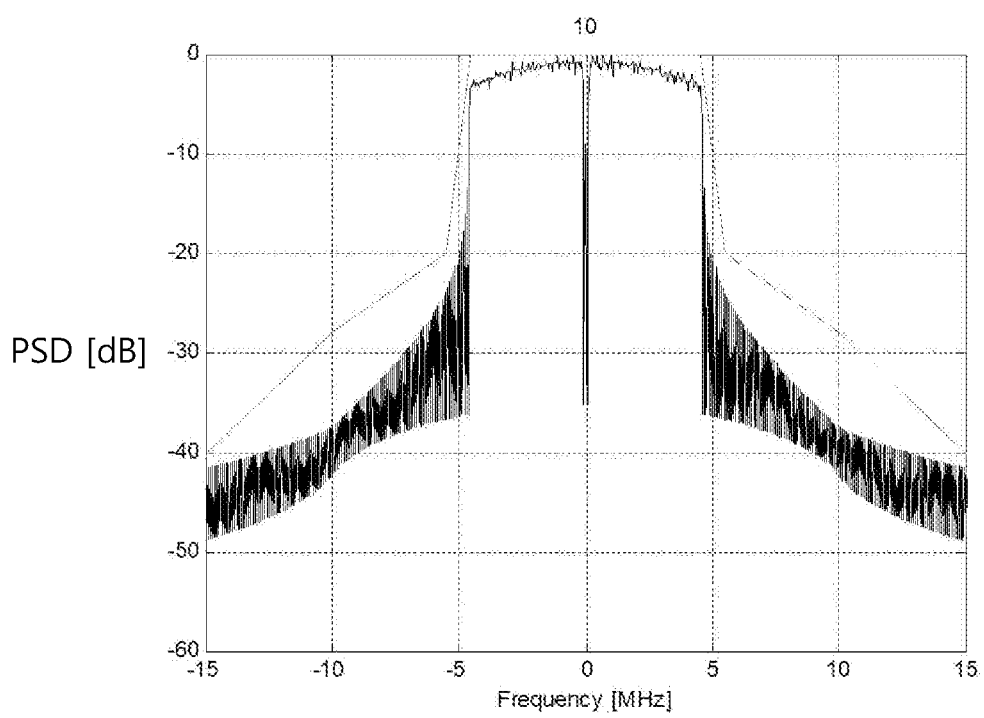
FIG. 32 shows a PSD within a 10 MHz spectrum mask of the 802.11p standard.

FIG. 32 shows a PSD within a 10 MHz spectrum mask of the 802.11p standard.

Referring to FIG. 32, the PSD value according to the tone configuration having 11 guard tones and 3 DC tones at 10 MHz may be smaller than the 10 MHz spectrum mask of the 802.11p standard.

C-iii) CASE 2: When considering the 10 MHz spectrum mask of the 802.11p standard, in order to use a maximum number of available tones, 7 guard tones (4+3 tones) may be allocated to the tones of the 10 MHz band. At this point, 1 tone or 3 tones may be allocated as the DC tones to the 10 MHz band tones.

C-iii)-a By configuring the guard tones using a minimum number of tones (7 tones), 120 available tones may be used. The method of configuring guard tones by using a minimum number of tones may enhance the data rate/throughput.

C-iii)-b Available tone indexes may be variously configured in accordance with the DC tones.

For example, in case 1 DC tone is used, the available tone indexes may be configured of [−60:−1, 1:60]. In the tone configuration, the number of pilots (or pilot tones) may be variously configured. For example, just as the 10 MHz transmission of the 802.11p standard, by allocating 4 pilots (or pilot tones), 116 tones may be used as data tones. In another example, by allocating 6 tones as pilots (or pilot tones), just as the 128-tone configuration, 114 tones may be used as the data tones. In yet another example, in order to maintain the size of the conventional (or existing) interleaver, 108 data tones and 12 pilot tones may be configured.

In another example, in case 3 DC tones are used, the available tone indexes may be configured of [−60:−2, 2:60]. In the tone configuration, the number of pilots (or pilot tones) may be variously configured. For example, just as the 10 MHz transmission of the 802.11p standard, by allocating 4 pilots (or pilot tones), 114 tones may be used as data tones. In another example, by allocating 6 tones as pilots (or pilot tones), just as the 128-tone configuration, 112 tones may be used as the data tones. In yet another example, in order to maintain the size of the conventional (or existing) interleaver, 108 data tones and 10 pilot tones may be configured.

Figure 33:
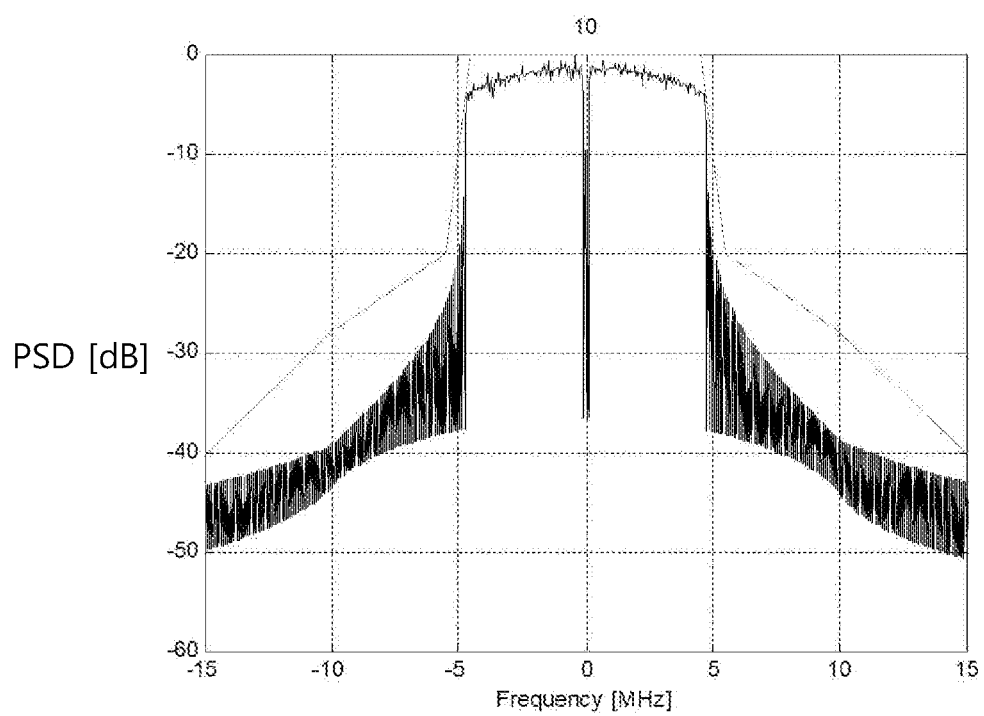
FIG. 33 shows a PSD within a 10 MHz spectrum mask of the 802.11p standard.

FIG. 33 shows a PSD within a 10 MHz spectrum mask of the 802.11p standard.

Referring to FIG. 33, the PSD value according to the tone configuration having 3 DC tones at 10 MHz may be smaller than the 10 MHz spectrum mask of the 802.11p standard.

C-iv) CASE 3: A spectrum mask being reduced to ½ of the 20 MHz spectrum mask of the 802.11ax standard in the frequency aspect may be considered as the spectrum mask for 10 MHz. At this point, when configuring the tones for 128 tones, a 40 MHz tone configuration of the 802.11ac standard may be used.

C-iv)-a In the embodiment of CASE 3, 11 guard tone (6+5 tones) may be allocated, and 1 tone or 3 tones may be allocated as the DC tones.

For example, in case 1 DC tone is used, the available tone indexes may be configured of [−58:−1, 1:58]. The number of available tones may be equal to 116 tones. In the tone configuration, the number of pilots (or pilot tones) may be variously configured. For example, just as the 10 MHz transmission of the 802.11p standard, by allocating 4 pilots (or pilot tones), 112 tones may be used as data tones. In another example, by allocating 6 tones as pilots (or pilot tones), just as the 128-tone configuration, 110 tones may be used as the data tones. In yet another example, in order to maintain the size of the conventional (or existing) interleaver, 108 data tones and 8 pilot tones may be configured.

In another example, in case 3 DC tones are used, the available tone indexes may be configured of [−58:−2, 2:58]. The number of available tones may be equal to 114 tones. In the tone configuration, the number of pilots (or pilot tones) may be variously configured. For example, just as the 10 MHz transmission of the 802.11p standard, by allocating 4 pilots (or pilot tones), 110 tones may be used as data tones. In another example, by allocating 6 tones as pilots (or pilot tones), just as the 128-tone configuration, 108 tones may be used as the data tones. At this point, the size of the conventional (or existing) interleaver may be maintained.

Figure 34:
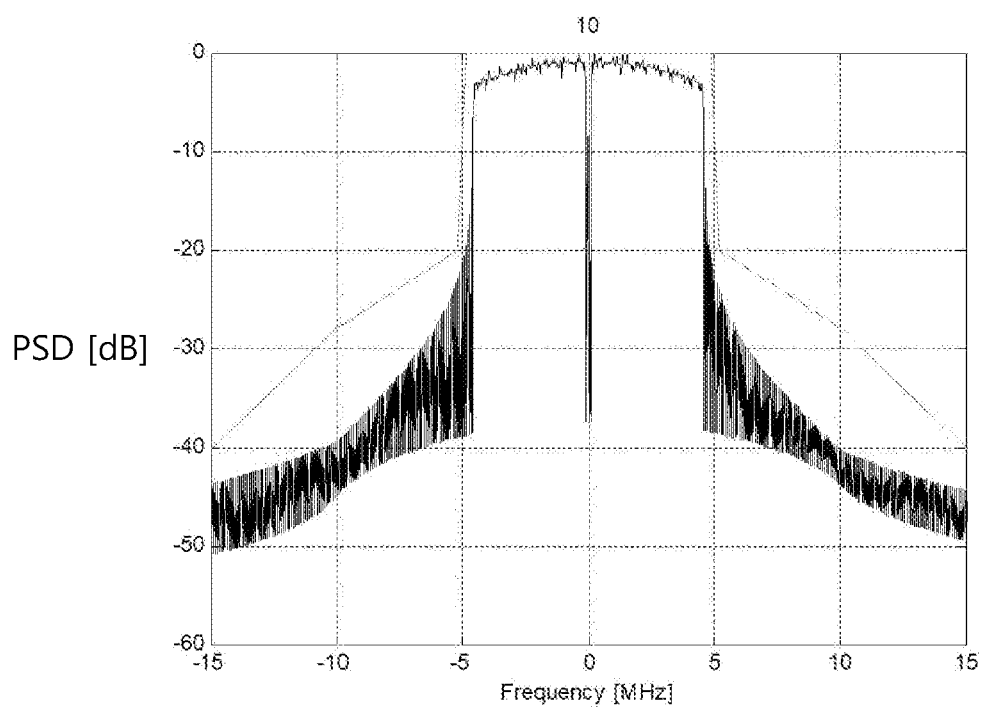
FIG. 34 shows a PSD within a 10 MHz spectrum mask of the 802.11p standard.

FIG. 34 shows a PSD within a 10 MHz spectrum mask of the 802.11p standard.

Referring to FIG. 34, the PSD value according to the tone configuration having 3 DC tones at 10 MHz may be smaller than the 10 MHz spectrum mask of the 802.11p standard.

C-v) CASE 4: A spectrum mask being reduced to ½ of the 20 MHz spectrum mask of the 802.11ax standard in the frequency aspect may be used herein. At this point, a maximum number of tones available for usage within the spectrum mask is equal to 62.4 tones. In order to use a maximum number of available tones within the spectrum mask, 5 guard tones (3+2 tones) may be allocated to the tones of the 10 MHz band. In this case, 1 tone or 3 tones may be allocated as the DC tones to the 10 MHz band tones.

C-v)-a Available tone indexes may be variously configured in accordance with the DC tones.

For example, in case 1 DC tone is used, the available tone indexes may be configured of [−61:−1, 1:61]. In the tone configuration, the number of pilots (or pilot tones) may be variously configured. For example, just as the 10 MHz transmission of the 802.11p standard, by allocating 4 pilots (or pilot tones), 118 tones may be used as data tones. In another example, by allocating 6 tones as pilots (or pilot tones), just as the 128-tone configuration, 116 tones may be used as the data tones. In yet another example, in order to maintain the size of the conventional (or existing) interleaver, 108 data tones and 14 pilot tones may be configured.

In another example, in case 3 DC tones are used, the available tone indexes may be configured of [−61:−2, 2:61]. In the tone configuration, the number of pilots (or pilot tones) may be variously configured. For example, just as the 10 MHz transmission of the 802.11p standard, by allocating 4 pilots (or pilot tones), 116 tones may be used as data tones. In another example, by allocating 6 tones as pilots (or pilot tones), just as the 128-tone configuration, 114 tones may be used as the data tones. In yet another example, in order to maintain the size of the conventional (or existing) interleaver, 108 data tones and 12 pilot tones may be configured.

Figure 35:
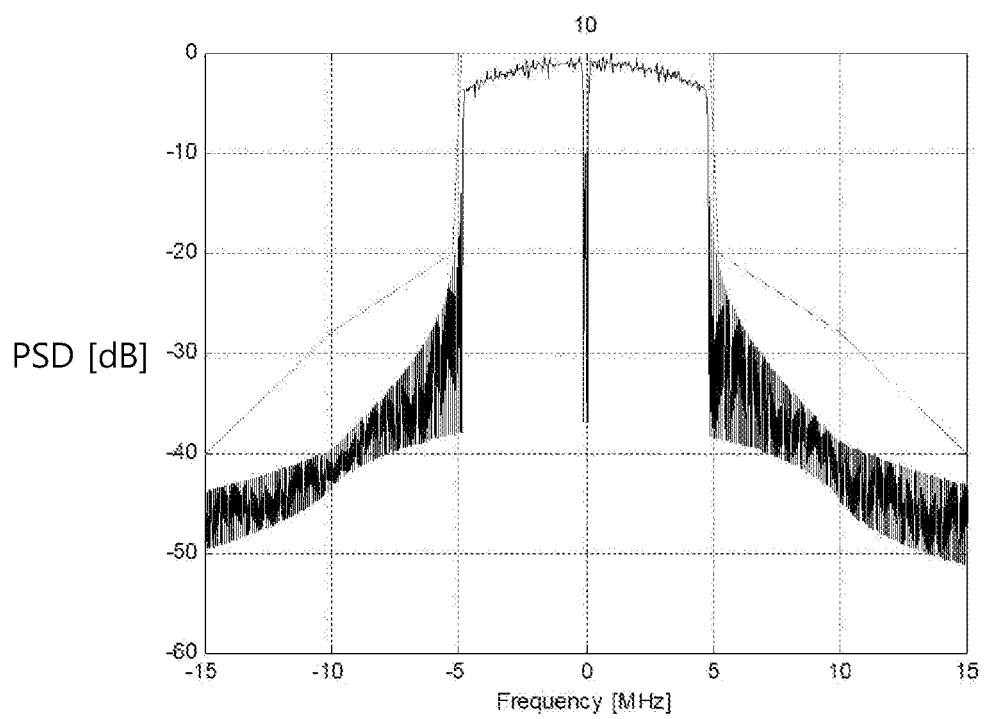
FIG. 35 shows a PSD within a 10 MHz spectrum mask of the 802.11p standard.

FIG. 35 shows a PSD within a 10 MHz spectrum mask of the 802.11p standard.

Referring to FIG. 35, the PSD value according to the tone configuration having 5 guard tones and 3 DC tones at 10 MHz may be smaller than the 10 MHz spectrum mask of the 802.11p standard.

C-vi) CASE 5: In the embodiment of CASE 4, in order to transmit a signal without any signal leakage, the guard tones may be further allocated with 1 tone on each side. That is, the guard tones may be configured of 4+3 tones. 1 tone or 3 tones may be allocated as the DC tones to the 10 MHz band tones.

C-vi)-a Available tone indexes may be variously configured in accordance with the DC tones.

For example, in case 1 DC tone is used, the available tone indexes may be configured of [−60:−1, 1:60]. In the tone configuration, the number of pilots (or pilot tones) may be variously configured. For example, just as the 10 MHz transmission of the 802.11p standard, by allocating 4 pilots (or pilot tones), 116 tones may be used as data tones. In another example, by allocating 6 tones as pilots (or pilot tones), just as the 128-tone configuration, 114 tones may be used as the data tones. In yet another example, in order to maintain the size of the conventional (or existing) interleaver, 108 data tones and 12 pilot tones may be configured.

In another example, in case 3 DC tones are used, the available tone indexes may be configured of [−60:−2, 2:60]. In the tone configuration, the number of pilots (or pilot tones) may be variously configured. For example, just as the 10 MHz transmission of the 802.11p standard, by allocating 4 pilots (or pilot tones), 114 tones may be used as data tones. In another example, by allocating 6 tones as pilots (or pilot tones), just as the 128-tone configuration, 112 tones may be used as the data tones. In yet another example, in order to maintain the size of the conventional (or existing) interleaver, 108 data tones and 10 pilot tones may be configured.

2.D. 20 MHz Band

D-i) Tones of the 20 MHz band may be configured of 256 tones. According to the embodiment, by allocating 3 tones as the DC tones, the tones of the 10 MHz band may be configured. According to the embodiment, in order to use a larger number of available tones, the tones of the 10 MHz band may be configured by allocating 3 tones as the DC tones. A detailed embodiment may hereinafter be described.

D-ii) CASE 1: A method for configuring tones by using a spectrum mask and a tone plan for 20 MHz of the 802.11ax standard.

D-ii)-a A signal may be transmitted by using 242 tones within one symbol including 11 guard tones (6+5 tones) and 3 DC tones. Herein, the available tone indexes may be configured of [−122:−2, 2:122].

Figure 36:
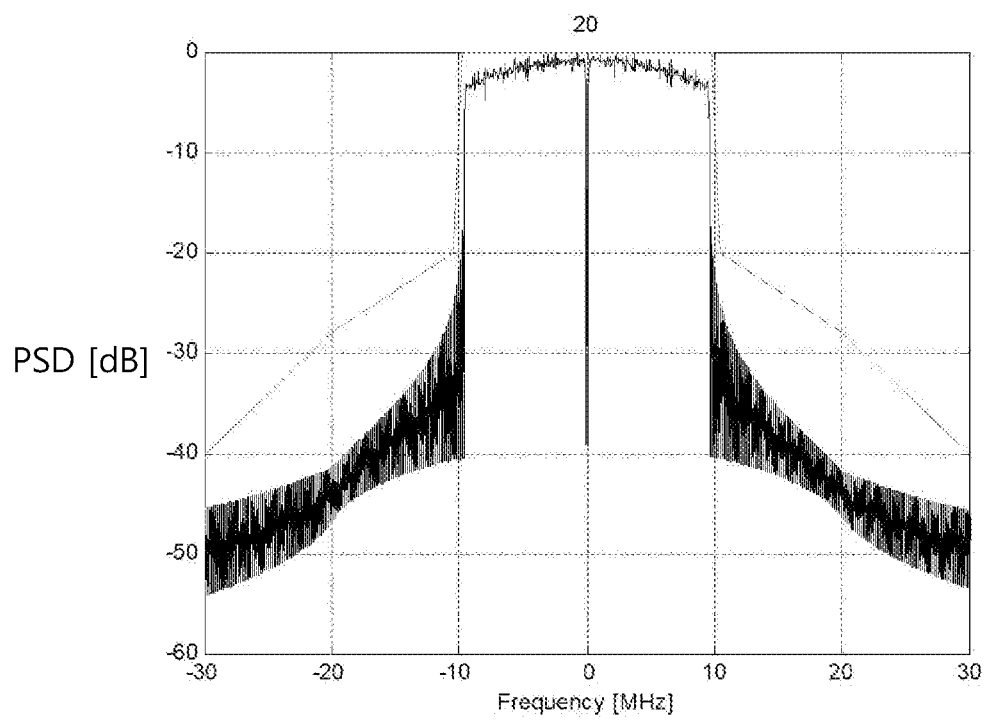
FIG. 36 shows a PSD within a 20 MHz spectrum mask of the 802.11ax standard.

FIG. 36 shows a PSD within a 20 MHz spectrum mask of the 802.11ax standard.

Referring to FIG. 36, the PSD value according to the tone configuration having 11 guard tones and 3 DC tones at 20 MHz may be smaller than the 20 MHz spectrum mask of the 802.11ax standard.

D-ii)-b Since the embodiment of CASE 1 uses the 20 MHz tone configuration of the conventional (or existing) 802.11ax standard, the method may be easily implemented.

D-ii)-c In the embodiment of CASE 1, in order to use a larger number of available tones, 7 guard tones (4+3 tones) may be allocated to the tones of the 20 MHz band. At this point, the number of available tones is equal to 246 tones.

The available tone indexes may be configured of [−124:−2, 2:124].

In the aforementioned tone configuration, the number of pilots may be variously configured.

For example, just as the 256-tone configuration, by allocating 8 tones as the pilots, 238 tones may be configured as the data tones. In another example, in order to maintain the size of the conventional (or existing) interleaver, 234 data tones and 12 pilot tones may be configured.

Figure 37:
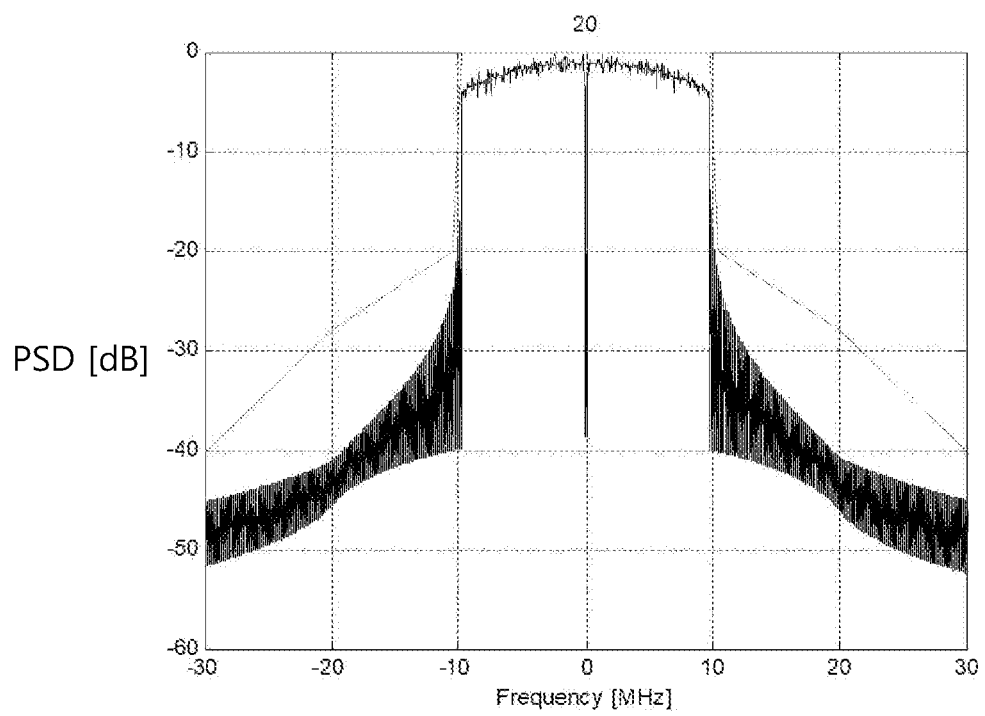
FIG. 37 shows a PSD within a 20 MHz spectrum mask of the 802.11ax standard.

FIG. 37 shows a PSD within a 20 MHz spectrum mask of the 802.11ax standard.

Referring to FIG. 37, the PSD value according to the tone configuration having 7 guard tones and 3 DC tones at 20 MHz may be smaller than the 20 MHz spectrum mask of the 802.11ax standard.

D-iii) CASE 2: A method for configuring tones while considering a 20 MHz spectrum mask of the 802.11ac standard.

Figure 38:
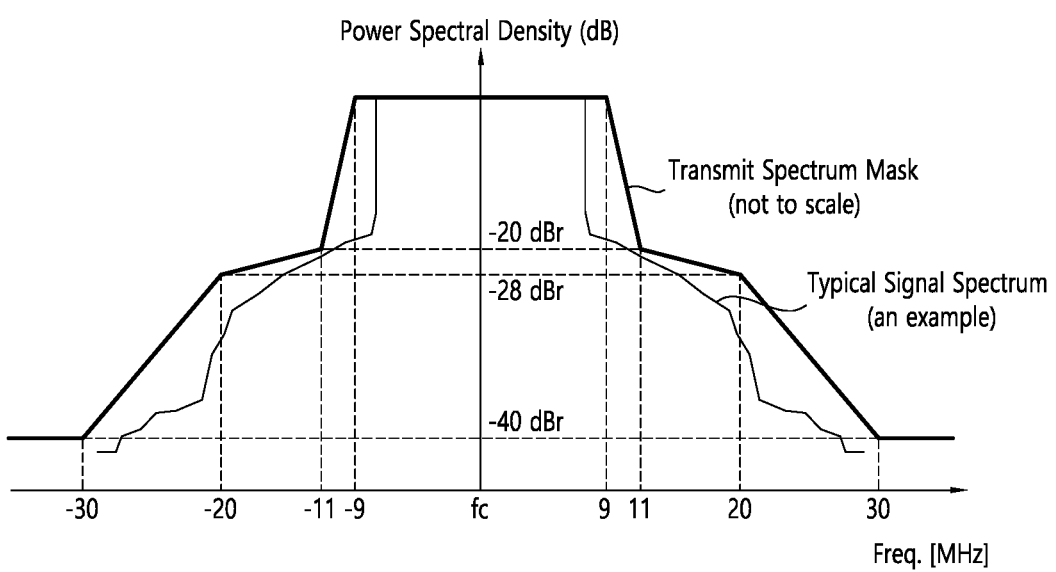
FIG. 38 shows a 20 MHz spectrum mask of the 802.11ac standard.

FIG. 38 shows a 20 MHz spectrum mask of the 802.11ac standard.

As shown in the drawing, the PSD value of the spectrum mask shown in FIG. 38 may be configured as −40 dBr at a −30 MHz position and may be configured as −28 dBr at a −20 MHz position. And, the PSD value of the spectrum mask shown in FIG. 38 increases linearly from the −30 MHz position to the −20 MHz position. Additionally, the PSD value of the spectrum mask shown in FIG. 38 may be configured as −20 dBr at a −11 MHz position. And, the PSD value of the spectrum mask shown in FIG. 38 increases linearly from the −20 MHz position to the −11 MHz position. Additionally, the PSD value of the spectrum mask shown in FIG. 38 may be configured as 0 dBr at a −9 MHz position. And, the PSD value of the spectrum mask shown in FIG. 38 increases linearly from the −11 MHz position to the −9 MHz position. Additionally, the PSD value of the spectrum mask shown in FIG. 38 may be configured as 0 dBr at a 9 MHz position. And, the PSD value of the spectrum mask shown in FIG. 38 is maintained consistently from the −9 MHz position to the 9 MHz position. Additionally, the PSD value of the spectrum mask shown in FIG. 38 may be configured as −20 dBr at an 11 MHz position. And, the PSD value of the spectrum mask shown in FIG. 38 decreases linearly from the 9 MHz position to the 11 MHz position. Additionally, the PSD value of the spectrum mask shown in FIG. 38 may be configured as −28 dBr at a 20 MHz position. And, the PSD value of the spectrum mask shown in FIG. 38 decreases linearly from the 11 MHz position to the 20 MHz position. Furthermore, the PSD value of the spectrum mask shown in FIG. 38 may be configured as −40 dBr at a 30 MHz position. And, the PSD value of the spectrum mask shown in FIG. 38 decreases linearly from the 20 MHz position to the 30 MHz position.

D-iii)-a In case the 20 MHz spectrum mask of the 802.11ac standard is applied, various tones may be configured while considering power leakage and usage of a maximum number of tones when performing signal transmission. A detailed tone configuration may hereinafter be described.

D-iii)-b As a method for configuring tones by using a tone plan for 802.11ac 80 MHz, 11 guard tones (6+5 tones) and 3 DC tones may be allocated. Additionally, in order to use a larger number of tones, the tones of the 20 MHz band may be configured by allocating 1 tone as the DC tone.

Available tone indexes may be variously configured in accordance with the DC tones.

For example, in case the number of DC tones is equal to 3, the available tone indexes may be configured of [−122:−2, 2:122]. In the tone configuration, the number of pilots may be variously configured.

Figure 39:
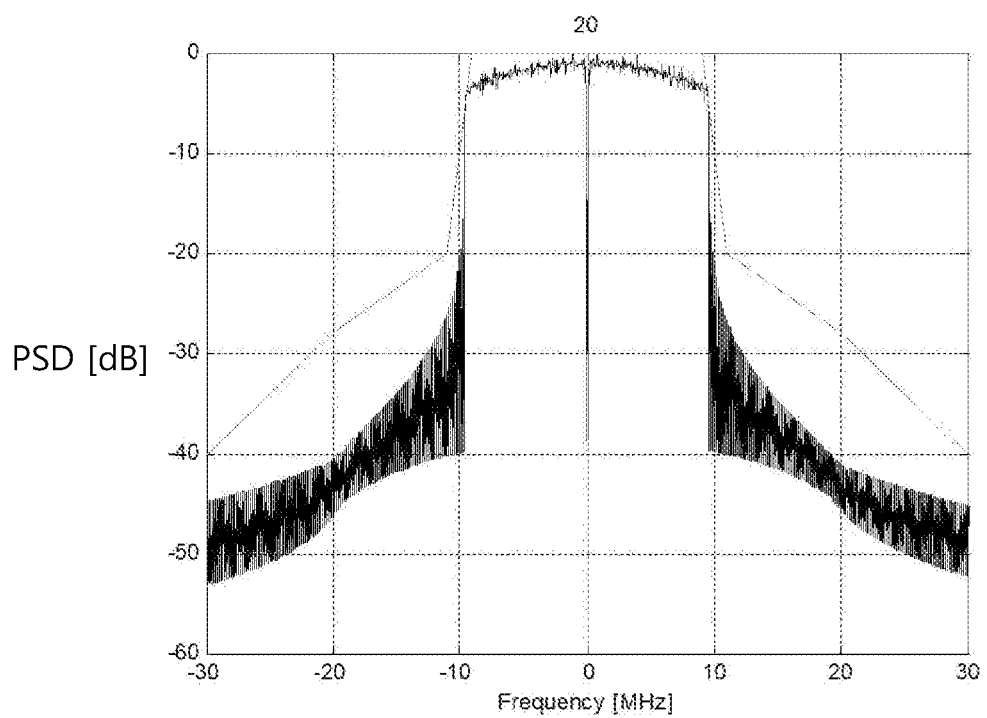
FIG. 39 shows a PSD within a 20 MHz spectrum mask of the 802.11ac standard.

FIG. 39 shows a PSD within a 20 MHz spectrum mask of the 802.11ac standard.

Referring to FIG. 39, the PSD value according to the tone configuration having 11 guard tones and 3 DC tones at 20 MHz may be smaller than the 20 MHz spectrum mask of the 802.11ac standard.

In another example, in case 1 DC tone is used, the available tone indexes may be configured of [−122:−1, 1:122]. The number of available tones may be equal to 244 tones. In the tone configuration, the number of pilots (or pilot tones) may be variously configured. For example, just as the 256-tone configuration, by allocating 8 tones as the pilots, 236 tones may be used as the data tones. In yet another example, in order to maintain the size of the conventional (or existing) interleaver, 234 data tones and 10 pilot tones may be configured.

4D-iii)-c Unlike the embodiment wherein 11 tones (6+5 tones) are allocated as the guard tones, in order to reduce signals deviating from the spectrum mask (i.e., in order to reduce signal leakage), the tones of the 20 MHz band may be configured by allocating 23 tones (12+11 tones) as the guard tones.

3. Third Embodiment—Method for Transmitting NGV Signal by Using the Same Tone Configuration in 10 MHz and 20 MHz (i.e., by Using Different Tone Spacing According to the BW)

3.E Configuration Method Using 64 Tones

E-i) A tone plan for 20 MHz of the 802.11ac standard may be used. By applying 2× down-clocking when performing 10 MHz transmission, and by not applying down-clocking when performing 20 MHz transmission, tones of the 10 MHz or 20 MHz band may be configured.

E-ii) 10 MHz Band

E-ii)-a Tones of the 10 MHz band may be configured of 64 tones. The tones of the 10 MHz band may be configured by applying 2× down-clocking to the tone plan for 20 MHz of the 802.11ac standard. That is, when performing signal transmission, 56 tones including 7 guard tones (4+3 tones) and 1 DC tone may be used.

E-ii)-b The available tone indexes considering the 7 guard tones (4+3 tones) and the 1 DC tone may be configured of [−28:−1, 1:28].

E-ii)-c Since the above-described method for configuring the tones of the 10 MHz band uses the conventional tone plan of the 802.11ac standard by applying 2× down-clocking to the tone plan, the method may be easily implemented. Additionally, by using the same number of pilots (4 tones) as the 802.11ac standard, the conventional tone structure may be used (or re-used).

E-iii) 20 MHz Band

E-iii)-a The tones of 20 MHz may be configured by using the conventional 20 MHz tone plan of the 802.11ac standard. At this point, the 11ac 20 MHz tone plan may be used (or re-used) without applying down-clocking.

E-iii)-b Since the embodiment according to 3.A-iii)-a uses (or re-uses) the conventional 20 MHz tone plan of the 802.11ac standard, the embodiment may be easily implemented. Since there is no change in the guard tones, DC tones, and/or pilot tones, the embodiment according to 3.A-iii)-a may be easily implemented.

E-iii)-c According to the embodiment according to E-iii)-a, by using the same tone plan as 10 MHz, the complexity in implementation may be reduced. Additionally, as compared to the symbol length when performing 10 MHz transmission, since the symbol length when performing signal transmission is ½, a 2× throughput gain may be achieved.

3.F Configuration Method Using 128 Tones

F-i) Tones of the 10 MHz band or 20 MHz band may be configured by using a 40 MHz tone plan of the 802.11ac standard. By applying different types of down-clocking in accordance with the bandwidth (BW), the 40 MHz tone plan of the 802.11ac standard may be used (or re-used).

F-ii) 10 MHz Band

F-ii)-a Tones of the 10 MHz band may be configured by applying 4× down-clocking to the 40 MHz tone plan of the 802.11ac standard.

F-ii)-b Since 4× down-clocking is applied to tone plan for the 40 MHz bandwidth of the 802.11ac standard, when configuring the tone plan for 10 MHz, the tone plan of 11ac 40 MHz may be used (or re-used). That is, the tones of 10 MHz may include 11 guard tones (6+5 tones) and 3 DC tones. When performing signal transmission, 114 tones may be used. The available tone indexes may be configured of [−58:−2, 2:58].

F-iii) 20 MHz Band

F-iii)-a Tones of the 20 MHz band may be configured by applying 2× down-clocking to the 40 MHz tone plan of the 802.11ac standard.

F-iii)-b Since 2× down-clocking is applied to 40 MHz of the 802.11ac standard, the method for configuring the tone plan for 20 MHz may use (or re-use) the tone plan of 40 MHz of the 802.11ac standard. That is, the tones of 20 MHz may include 11 guard tones (6+5 tones) and 3 DC tones. When performing signal transmission, 114 tones may be used. The available tone indexes may be configured of [−58:−2, 2:58].

F-iii)-c According to the embodiment of F-iii)-a, by using the same tone plan as 10 MHz, the complexity in implementation may be reduced. Additionally, as compared to the symbol length when performing 10 MHz transmission, since the symbol length when performing signal transmission is ½, a 2× throughput gain may be achieved.

3.G According to the third embodiment, by using one tone plan regardless of the BW, the complexity in implementation may be reduced. Additionally, the interleaver used in the conventional 802.11ac standard may be used (or re-used). According to the third embodiment, different types of tone allocation may not be required to be defined for each BW. Additionally, when generating signals, interleavers having the same size may be used regardless of the BW.

Figure 40:
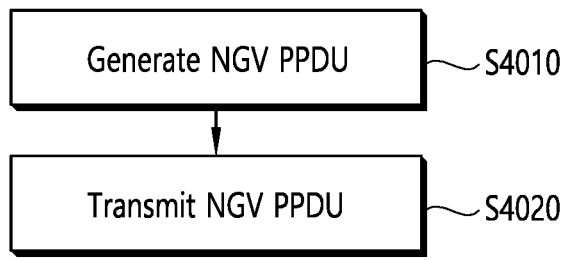
FIG. 40 is a flowchart for describing operations of a transmitting STA.

FIG. 40 is a flowchart for describing operations of a transmitting STA.

Referring to FIG. 40, in step S4010, a transmitting STA may generate a Next Generation Vehicular network (NGV) PPDU. The NGV PPDU may include a legacy control field, an NGV control field, and an NGV data field. For example, the legacy control field may include L-STF, L-LTF, and/or L-SIG field. And, the NGV control field may include NGV-SIG field, NGV-STF, and/or NGV-LTF.

According to an embodiment, the NGV PPDU may include information on the NGV PPDU type. The information on the NGV PPDU type may be information for verifying, by a receiving STA, that the PPDU is an NGV PPDU. For example, the NGV PPDU may include a first L-SIG field and a second L-SIG field. The first L-SIG field and the second L-SIG field may include the same bit information. The first L-SIG field may be followed by the second L-SIG field. The information related to the NGV PPDU type may be included in the second L-SIG field. The second L-SIG field may also be referred to as an RL-SIG field.

In step S4020, the transmitting STA may transmit the NGV PPDU. A bandwidth of the NGV PPDU may be 20 MHz. The NGV PPDU may be transmitted based on frequency spacing of 156.25 kHz. The transmitting STA may transmit the NGV PPDU through a 5.9 GHz band based on a transmit spectrum mask.

The NGV PPDU may be transmitted based on a guard region having a first sub-carrier index range, a Direct Current (DC) region having a second sub-carrier index range, and a data and pilot region having a third sub-carrier index range.

According to the embodiment, the first sub-carrier index range may be configured of [−64:−59, 59:63]. And, the second sub-carrier index range may be configured of [−1:1]. And, the third sub-carrier index range may be configured of [−58:−2, 2:58]. The third sub-carrier index range may be configured to include 4 pilot tones.

According to the embodiment, the first sub-carrier index range may be configured of [−64:−59, 59:63]. And, the second sub-carrier index range may be configured of [0]. And, the third sub-carrier index range may be configured of [−58:−1, 1:58].

Figure 41:
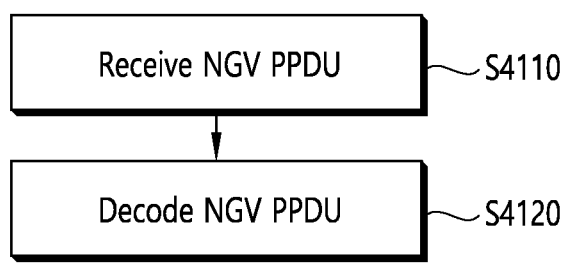
FIG. 41 is a flowchart for describing operations of a receiving STA.

FIG. 41 is a flowchart for describing operations of a receiving STA.

Referring to FIG. 41, in step S4110, a receiving STA may receive an NGV PPDU. The NGV PPDU may include a legacy control field, an NGV control field, and an NGV data field. For example, the legacy control field may include L-STF, L-LTF, and/or L-SIG field. And, the NGV control field may include NGV-SIG field.

According to an embodiment, the NGV PPDU may include information on the NGV PPDU type. The receiving STA may verify, based on the information on the NGV PPDU type, that the received PPDU is an NGV PPDU. For example, the NGV PPDU may include a first L-SIG field and a second L-SIG field. The first L-SIG field and the second L-SIG field may include the same bit information. The first L-SIG field may be followed by the second L-SIG field. The second L-SIG field may also be referred to as an RL-SIG field. The information related to the NGV PPDU type may be included in the second L-SIG field. And, at this point, the second L-SIG field may be configured of one ODFM symbol and may be referred to as another field other than the RL-SIG field.

In step S4120, the receiving STA may decode the NGV PPDU. A bandwidth of the NGV PPDU may be 20 MHz. The NGV PPDU may be received based on frequency spacing of 156.25 kHz.

The NGV PPDU may be decoded based on a guard region having a first sub-carrier index range, a Direct Current (DC) region having a second sub-carrier index range, and a data and pilot region having a third sub-carrier index range.

According to the embodiment, the receiving STA may decode the NGV PPDU based on the first sub-carrier index range, which is configured of [−64:−59, 59:63]. And, the receiving STA may decode the NGV PPDU based on the second sub-carrier index range, which is configured of [−1:1]. And, the receiving STA may decode the NGV PPDU based on the third sub-carrier index range, which is configured of [−58:−2, 2:58]. The third sub-carrier index range may be configured to include 4 pilot tones.

According to the embodiment, the receiving STA may decode the NGV PPDU based on the first sub-carrier index range, which is configured of [−64:−59, 59:63]. And, the receiving STA may decode the NGV PPDU based on the second sub-carrier index range, which is configured of [0]. And, the receiving STA may decode the NGV PPDU based on the third sub-carrier index range, which is configured of [−58:−1, 1:58].

Figure 42:
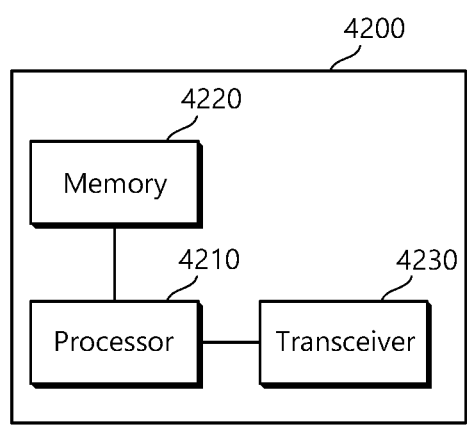
FIG. 42 illustrates a transmitting STA or a receiving STA to which an example of the present disclosure is applied.

FIG. 42 illustrates a transmitting STA or a receiving STA to which an example of the present disclosure is applied.

An STA (4200) of FIG. 42 may be a transmitting STA or a receiving STA (or AP).

Referring to FIG. 42, the STA 4200 may include a processor 4210, a memory 4220, and a transceiver 4230. The features of FIG. 42 may be applied to a non-AP STA or an AP STA. The illustrated processor, memory, and transceiver may be implemented as separate chips, or at least two or more blocks/functions may be implemented through a single chip.

The illustrated transceiver 4230 performs a signal transmission/reception operation. Specifically, the transceiver 4230 may transmit and receive IEEE 802.11 packets (e.g., IEEE 802.11a/b/g/n/ac/ax/be, etc.).

The processor 4210 may implement the functions, processes, and/or methods proposed in the present disclosure. Specifically, the processor 4210 may receive a signal through the transceiver 4230, process the received signal, generate a transmission signal, and perform control for signal transmission.

The processor 4210 may include an application-specific integrated circuit (ASIC), another chipset, a logic circuit, and a data processing device. The memory 4220 may include read-only memory (ROM), random access memory (RAM), flash memory, memory card, storage medium, and/or other storage device.

The memory 4220 may store a signal (i.e., a reception signal) received through the transceiver and may store a signal (i.e., a transmission signal) to be transmitted through the transceiver. That is, the processor 4210 may acquire the received signal through the memory 4220 and store the signal to be transmitted in the memory 4220.

Figure 43:
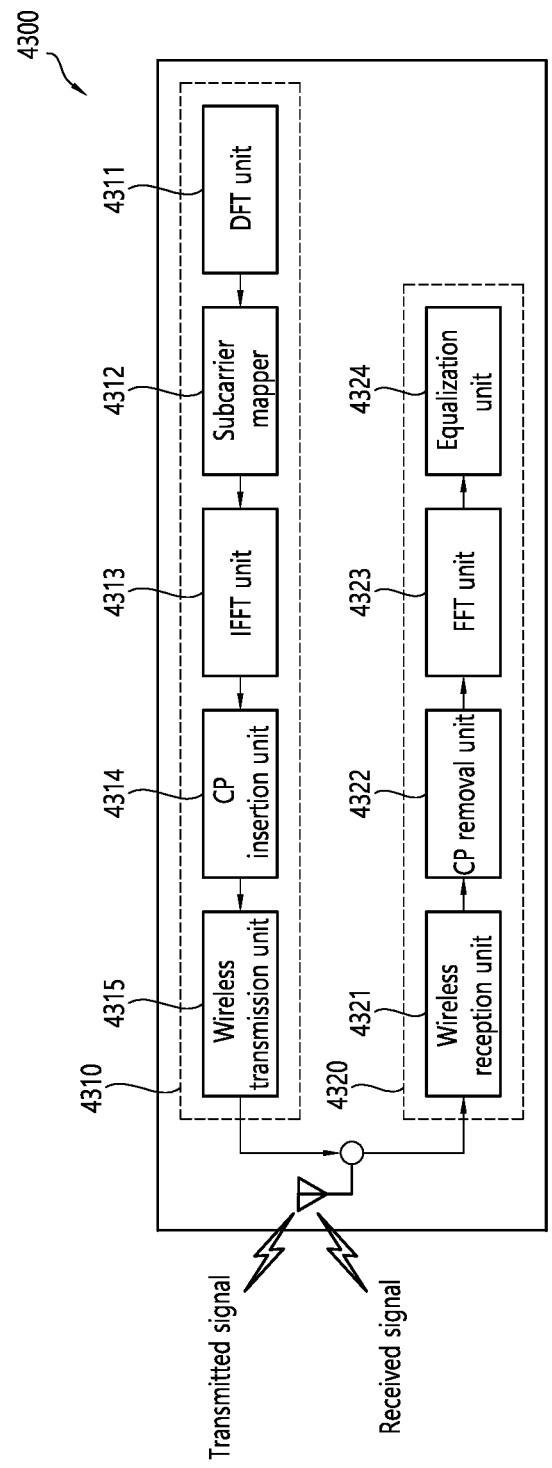
FIG. 43 illustrates another example of a detailed block diagram of a transceiver.

FIG. 43 illustrates another example of a detailed block diagram of a transceiver. Some or all blocks of FIG. 43 may be included in the processor 4210. Referring to FIG. 43, a transceiver 4300 includes a transmission part 4301 and a reception part 4302. The transmission part 4301 includes a discrete Fourier transform (DFT) unit 4311, a subcarrier mapper 4312, an IDFT/(inverse fast Fourier transform) IFFT unit 4313, a CP insertion unit 4314, and a wireless transmission unit 4315. The transmission part 4301 may further include a modulator. In addition, for example, the transmission part 4301 may further include a scramble unit (not shown), a modulation mapper (not shown), a layer mapper (not shown), and a layer permutator (not shown), and these components may be arranged before the DTF unit 4311. That is, in order to prevent an increase in a peak-to-average power ratio (PAPR), the transmission part 4301 allows information to first go through first the DFT unit 4311 before mapping a signal to a subcarrier. After a signal spread by the DFT unit 4311 (or precoded in the same sense) is mapped through the subcarrier mapper 4312, the mapped signal goes through the IDTF/IFFT unit 4313 so as to be generated as a signal on a time axis.

The DFT unit 4311 performs DFT on input symbols and outputs complex-valued symbols. For example, when Ntx symbols are input (here, Ntx is a natural number), a DFT size is Ntx. The DFT unit 4311 may be referred to as a transform precoder. The subcarrier mapper 4312 maps the complex-valued symbols to each subcarrier in a frequency domain. The complex symbols may be mapped to resource elements corresponding to a resource block allocated for data transmission. The subcarrier mapper 4312 may be referred to as a resource element mapper. The IDFT/IFFT unit 4313 performs IDFT/IFFT on an input symbol and outputs a baseband signal for data as a time domain signal. The CP insertion unit 4314 copies a rear part of the base band signal for data and inserts it into a front part of the base band signal for data. Inter-symbol interference (ISI) and inter-carrier interference (ICI) may be prevented through CP insertion, so that orthogonality may be maintained even in a multipath channel.

Meanwhile, the receiving part 4302 includes a wireless reception unit 4321, a CP removal unit 4322, an FFT unit 4323, an equalization unit 4324, and the like. The wireless reception unit 4321, the CP removing unit 4322, and the FFT unit 4323 of the receiving part 4302 perform reverse functions of the wireless transmission unit 4315, the CP inserting unit 4314, and the IFF unit 4313 of the transmitting part 4301. The receiving part 4302 may further include a demodulator.

In addition to the illustrated blocks, the transceiver of FIG. 43 may include a reception window controller (not shown) extracting a part of a received signal and a decoding operation processing unit (not shown) performing a decoding operation on a signal extracted through a reception window.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:
1. A method in a Wireless Local Area Network (WLAN) system, the method comprising:
generating a Next Generation Vehicular network (NGV) Physical Protocol Data Unit (PPDU) including a legacy signal (L-SIG) field including length information, a repeated L-SIG field which is a repeat of the L-SIG field, an NGV signal (NGV-SIG) field including information for interpreting the NGV PPDU, and an NGV data field, wherein the L-SIG field is transmitted on a first symbol, wherein the repeated L-SIG field is contiguous to the L-SIG field and transmitted on a second symbol being distinct from the first symbol, wherein the NGV-SIG field is contiguous to the repeated L-SIG field and transmitted on a third symbol being distinct from the second symbol; and transmitting the NGV PPDU, wherein a bandwidth of the NGV PPDU is 20 MHz, and the NGV PPDU is transmitted based on frequency spacing of 156.25 kHz, and wherein the NGV PPDU is transmitted based on guard tones, Direct Current (DC) tones, pilot sub-carriers, and data sub-carriers, and wherein the pilot sub-carriers and the data sub-carriers have a sub-carrier index range which is defined based on [−58:−2, 2:58].

2. The method of claim 1, wherein the NGV PPDU is generated based on a sub-carrier index range of a 40 MHz Very High Throughput (VHT) PPDU having 2× down-clocking applied thereto.

3. The method of claim 1, wherein the guard tones are defined based on [−64:−59, 59:63], and wherein the DC tones are defined based on [−1:1].

4. The method of claim 1, wherein the pilot tones are transmitted on 6 subcarriers.

5. The method of claim 1, wherein the step of transmitting the NGV PPDU comprises:

transmitting the NGV PPDU through a 5.9 GHz band, based on a transmit spectrum mask.

6. The method of claim 1, wherein the NGV PPDU includes information related to a type of the NGV PPDU.

7. A transmitting station (STA) in a Wireless Local Area Network (WLAN) system, the transmitting STA comprising:

a transceiver transmitting and receiving radio signals; and a processor being operatively connected to the transceiver, wherein the processor is configured to:

generate a Next Generation Vehicular network (NGV) Physical Protocol Data Unit (PPDU) including a legacy signal (L-SIG) field including length information, a repeated L-SIG field which is a repeat of the L-SIG field, an NGV signal (NGV-SIG) field including information for interpreting the NGV PPDU, and an NGV data field, wherein the L-SIG field is transmitted on a first symbol, wherein the repeated L-SIG field is contiguous to the L-SIG field and transmitted on a second symbol being distinct from the first symbol, wherein the NGV-SIG field is contiguous to the repeated L-SIG field and transmitted on a third symbol being distinct from the second symbol; and transmit the NGV PPDU, wherein a bandwidth of the NGV PPDU is 20 MHz, and the NGV PPDU is transmitted based on frequency spacing of 156.25 kHz, and wherein the NGV PPDU is transmitted based on guard tones, Direct Current (DC) tones, pilot sub-carriers, and data sub-carriers, and wherein the pilot sub-carriers and the data sub-carriers have a sub-carrier index range which is defined based on [−58:−2, 2:58].

8. The transmitting STA of claim 7, wherein the processor is configured to generate the NGV PPDU based on a sub-carrier index range of a 40 MHz Very High Throughput (VHT) PPDU having 2× down-clocking applied thereto.

9. The transmitting STA of claim 7, wherein the guard tones are defined based on [−64:−59, 59:63], and wherein the DC tones are defined based on [−1:1].

10. The transmitting STA of claim 7, wherein the pilot tones are transmitted on 6 subcarriers.

11. The transmitting STA of claim 7, wherein the processor is configured to transmit the NGV PPDU through a 5.9 GHz band, based on a transmit spectrum mask.

12. The transmitting STA of claim 7, wherein the processor configures the NGV PPDU to include information related to a type of the NGV PPDU.

\* \* \* \* \*